US006985908B2

(12) United States Patent
Nakano

(10) Patent No.: US 6,985,908 B2
(45) Date of Patent: Jan. 10, 2006

(54) TEXT CLASSIFICATION APPARATUS

(75) Inventor: Hiraku Nakano, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 447 days.

(21) Appl. No.: 10/251,812

(22) Filed: Sep. 23, 2002

(65) Prior Publication Data

US 2003/0084022 A1 May 1, 2003

(30) Foreign Application Priority Data

Nov. 1, 2001 (JP) ............................. 2001-336052

(51) Int. Cl.
*G06F 17/30* (2006.01)
(52) U.S. Cl. .............................. 707/102; 707/2; 705/1
(58) Field of Classification Search ................ 707/102, 707/2; 705/1
See application file for complete search history.

(56) References Cited

U.S. PATENT DOCUMENTS

| | | | | |
|---|---|---|---|---|
| 4,554,631 A | * | 11/1985 | Reddington | 707/4 |
| 5,297,039 A | * | 3/1994 | Kanaegami et al. | 707/5 |
| 5,325,444 A | * | 6/1994 | Cass et al. | 382/177 |
| 5,375,235 A | * | 12/1994 | Berry et al. | 707/5 |
| 5,832,470 A | | 11/1998 | Morita et al. | |
| 5,913,211 A | * | 6/1999 | Nitta | 707/5 |
| 5,987,460 A | * | 11/1999 | Niwa et al. | 707/6 |
| 6,016,546 A | * | 1/2000 | Kephart et al. | 713/200 |
| 6,078,913 A | * | 6/2000 | Aoki et al. | 707/2 |
| 6,088,707 A | * | 7/2000 | Bates et al. | 715/501.1 |
| 6,128,613 A | * | 10/2000 | Wong et al. | 707/7 |
| 6,167,368 A | * | 12/2000 | Wacholder | 704/9 |
| 6,169,543 B1 | * | 1/2001 | Wehmeyer | 725/47 |
| 6,286,000 B1 | * | 9/2001 | Apte et al. | 707/5 |
| 6,591,292 B1 | * | 7/2003 | Morrison et al. | 709/206 |
| 6,678,690 B2 | * | 1/2004 | Kobayashi et al. | 707/101 |
| 6,751,613 B1 | * | 6/2004 | Lee et al. | 707/5 |
| 6,757,646 B2 | * | 6/2004 | Marchisio | 704/8 |
| 6,772,149 B1 | * | 8/2004 | Morelock et al. | 707/6 |
| 6,845,374 B1 | * | 1/2005 | Oliver et al. | 707/5 |

(Continued)

FOREIGN PATENT DOCUMENTS

JP        6-139291        5/1994

(Continued)

OTHER PUBLICATIONS

Mase, Hisao., et al. "Automatic Patents Categorization and Its Evaluation." Journal of Information Processing Society of Japan, Information Processing Society of Japan, Jul. 15, 1998, vol. 39, No. 7, pp. 2207-2216 (w/Partial English Translation).

*Primary Examiner*—Wayne Amsbury
(74) *Attorney, Agent, or Firm*—McDermott Will & Emery LLP

(57) ABSTRACT

For the evaluation of a plurality of texts, three correspondence tables of keywords and evaluation sections, namely a priority, a regular and an auxiliary correspondence table, are established, so as to automatically assign the most fitting evaluation section from a plurality of evaluation sections to texts one by one. The text data in the texts are analyzed, the occurrence count of keywords included in the correspondence table is counted, and, processing the priority, regular and auxiliary correspondence table in that order, if there is a keyword included in the correspondence table whose occurrence count is not zero, then the section corresponding to the keyword with the maximum occurrence count is determined as the evaluation section.

12 Claims, 45 Drawing Sheets

| TEAM NAME | PRINCIPAL FUNCTIONS OF DEVELOPED LSIS |
|---|---|
| T1 | DEMODULATION, ERROR CORRECTION AND UPLINK MODULATION FOR DIGITAL TV RECEIVERS |
| T2 | SEPARATION OF MULTIPLEXED SIGNALS, DECRYPTION, DECODING OF IMAGE/AUDIO DATA FOR DIGITAL TV RECEIVERS |
| T3 | DECRYPTION, DECODING OF IMAGE/AUDIO DATA FOR DVD PLAYERS |
| T4 | ENCODING/DECODING OF IMAGE/AUDIO DATA FOR DVD RECORDERS |
| T5 | SIGNAL PROCESSING OF ELECTRONIC CAMERAS AND VIDEO CAMERAS |
| T6 | ENCODING/DECODING OF IMAGE/AUDIO DATA, SHUFFLING, DESHUFFLING, RECORDING ENCODING / RECORDING DECODING OF IMAGE/AUDIO DATA, ERROR CORRECTION FOR DIGITAL VTRS |
| T7 | SERVO CONTROL, SIGNAL PROCESSING FOR CD PLAYERS |
| T8 | SERVO CONTROL, ATRAC ENCODING/DECODING FOR MD PLAYERS |

U.S. PATENT DOCUMENTS

| | | | |
|---|---|---|---|
| 6,847,972 B1 * | 1/2005 | Vernau et al. | 707/101 |
| 2002/0062302 A1 * | 5/2002 | Oosta | 707/1 |
| 2002/0089551 A1 * | 7/2002 | Hugh et al. | 345/853 |
| 2002/0091678 A1 * | 7/2002 | Miller et al. | 707/3 |
| 2002/0116291 A1 * | 8/2002 | Grasso et al. | 705/27 |

FOREIGN PATENT DOCUMENTS

| | | |
|---|---|---|
| JP | 07-262200 | 10/1995 |
| JP | 2000-222431 A | 8/2000 |
| JP | 2001-060199 A | 3/2001 |

* cited by examiner

FIG. 3

| 30 U.S. PATENTS TO BE EVALUATED | 5526045, 5581362, 5594550, 5655051, 5657098, 5691819, 5699125, 5739853, 5742341, 5751375, 5767845, 5784107, 5802241, 5818435, 5825421, 5852446, 5884004, 5892879, 5907659, 5909255, 5973681, 5978032, 5999696, 6040864, 6044198, 6049651, 6069667, 6088507, 6094455, 6148136 |
|---|---|

FIG. 4

| TEAM NAME | PRINCIPAL FUNCTIONS OF DEVELOPED LSIS |
|---|---|
| T1 | DEMODULATION, ERROR CORRECTION AND UPLINK MODULATION FOR DIGITAL TV RECEIVERS |
| T2 | SEPARATION OF MULTIPLEXED SIGNALS, DECRYPTION, DECODING OF IMAGE/AUDIO DATA FOR DIGITAL TV RECEIVERS |
| T3 | DECRYPTION, DECODING OF IMAGE/AUDIO DATA FOR DVD PLAYERS |
| T4 | ENCODING/DECODING OF IMAGE/AUDIO DATA FOR DVD RECORDERS |
| T5 | SIGNAL PROCESSING OF ELECTRONIC CAMERAS AND VIDEO CAMERAS |
| T6 | ENCODING/DECODING OF IMAGE/AUDIO DATA, SHUFFLING, DESHUFFLING, RECORDING ENCODING / RECORDING DECODING OF IMAGE/AUDIO DATA, ERROR CORRECTION FOR DIGITAL VTRS |
| T7 | SERVO CONTROL, SIGNAL PROCESSING FOR CD PLAYERS |
| T8 | SERVO CONTROL, ATRAC ENCODING/DECODING FOR MD PLAYERS |

FIG. 6A

| KEYWORD | EVALUATION SECTION | WEIGHTING |
|---|---|---|
| AAC | T2 | 1.0 |
| AC3 | T2 | 1.0 |
| ATRAC | T8 | 1.0 |
| CD | T7 | 1.0 |
| CD ROM | T7 | 1.0 |
| CD ROM player | T7 | 1.0 |
| CD player | T7 | 1.0 |
| CG | NOT APPLICABLE | 1.0 |
| DAD player | T7 | 1.0 |
| DCT | T4 | 1.0 |
| DVB | T2 | 1.0 |
| DVC | T6 | 1.0 |
| DVD player | T3 | 1.0 |
| DVD recorder | T4 | 1.0 |
| EDTV | Y | 1.0 |
| EPG | T2 | 1.0 |
| MD | T8 | 1.0 |
| MD player | T8 | 1.0 |
| MUSE | Y | 1.0 |
| OFDM | T1 | 1.0 |
| PCM audio | T7 | 1.0 |
| QAM | T1 | 1.0 |
| QPSK | T1 | 1.0 |
| Reed Solomon | T1 | 1.0 |
| TBC | T6 | 1.0 |
| Trellis | T1 | 1.0 |
| VSB | T1 | 1.0 |
| Viterbi | T1 | 1.0 |
| Y/C separating | Y | 0.5 |
| Y/C separation | Y | 0.5 |
| blocking effect | T4 | 0.5 |
| broadcasting satellite receiver | T1 | 0.5 |
| chromakey | Y | 0.5 |
| compact disk | T7 | 0.5 |
| composite color television signal | Y | 0.5 |

FIG. 6B

| KEYWORD | EVALUATION SECTION | WEIGHTING |
|---|---|---|
| composite signal | Y | 0.5 |
| composite television signal | Y | 0.5 |
| compressing code | T4 | 0.5 |
| compression code | T4 | 0.5 |
| computer graphics | NOT APPLICABLE | 0.5 |
| conditional access | T2 | 0.5 |
| demodulation | T1 | 0.5 |
| demodulator | T1 | 0.5 |
| deshuffling | T6 | 0.5 |
| digital VCR | T6 | 0.5 |
| digital VTR | T6 | 0.5 |
| digital audio disk | T7 | 0.5 |
| digital camcorder | T6 | 0.5 |
| digital camera | T5 | 0.5 |
| digital still camera | T5 | 0.5 |
| digital video camera | T5 | 0.5 |
| disk reproducing device | T3 | 0.5 |
| edge detection | T6 | 0.5 |
| electronic TV program guide | T2 | 0.5 |
| electronic camera | T5 | 0.5 |
| electronic program guide | T2 | 0.5 |
| electronic still camera | T5 | 0.5 |
| error correcting check bit | T1 | 0.5 |
| error correcting syndrome | T1 | 0.5 |
| fade in | T6 | 0.5 |
| fade out | T6 | 0.5 |
| flicker | Y | 0.5 |
| high efficiency coding | T4 | 0.5 |
| high efficiency encoding | T4 | 0.5 |
| image pickup | T5 | 0.5 |
| image sensing | T5 | 0.5 |
| image sensor | T5 | 0.5 |
| ink jet printer | NOT APPLICABLE | 0.5 |
| magneto optical disk | T3 | 0.5 |
| mini disk | T8 | 0.5 |

FIG. 6C

| KEYWORD | EVALUATION SECTION | WEIGHTING |
|---|---|---|
| modulation | T1 | 0.5 |
| modulator | T1 | 0.5 |
| motion compensation | T4 | 0.5 |
| motion vector | T4 | 0.5 |
| optical disk | T3 | 0.5 |
| optical magnetic disk | T3 | 0.5 |
| orthogonal transform | T4 | 0.5 |
| photo sensor | T5 | 0.5 |
| polygon | NOT APPLICABLE | 0.5 |
| quantization | T4 | 0.5 |
| run length limited code | T4 | 0.5 |
| satellite broadcasting receiver | T1 | 0.5 |
| satellite communication | T1 | 0.5 |
| satellite telecasting system | T1 | 0.5 |
| sharpness | Y | 0.5 |
| shuffling | T6 | 0.5 |
| still video camera | T5 | 0.5 |
| television camera | T5 | 0.5 |
| texture area | NOT APPLICABLE | 0.5 |
| texture mapping | NOT APPLICABLE | 0.5 |
| texture pattern | NOT APPLICABLE | 0.5 |
| time axis compensation | T6 | 0.5 |
| time axis correction | T6 | 0.5 |
| time base corrector | T6 | 0.5 |
| transcoder | T4 | 0.5 |
| transport packet | T2 | 0.5 |
| transport stream | T2 | 0.5 |
| variable length coding | T4 | 0.5 |
| video camera | T5 | 0.5 |
| video disk | T3 | 0.5 |
| video disk player | T3 | 0.5 |
| video disk reproducing system | T3 | 0.5 |
| video printer | NOT APPLICABLE | 0.5 |

FIG. 7

| EVALUATION SECTION | KEYWORD |
|---|---|
| T1 | OFDM, QAM, QPSK, Reed Solomon, Trellis, VSB, Viterbi, broadcasting satellite receiver, demodulation, demodulator, error correcting check bit, error correcting syndrome, modulation, modulator, satellite broadcasting receiver, satellite communication, satellite telecasting system |
| T2 | AAC, AC3, DVB, EPG, conditional access, electronic TV program guide, electronic program guide, transport packet, transport stream |
| T3 | DVD player, disk reproducing device, magneto optical disk, optical disk, optical magnetic disk, video disk, video disk player |
| T4 | DCT, DVD recorder, blocking effect, compressing code, compression code, high efficiency coding, high efficiency encoding, motion compensation, motion vector, orthogonal transform, quantization, run length limited code, transcoder, variable length coding |
| T5 | digital camera, digital still camera, electronic camera, electronic still camera, image pickup, image sensing, image sensor, photo sensor, still video camera, television camera, video camera |
| T6 | DVC, TBC, deshuffling, digital VCR, digital VTR, digital camcorder, edge detection, fade in, fade out, shuffling, time axis compensation, time axis correction, time base corrector |
| T7 | CD, CD ROM, CD ROM player, CD player, DAD player, PCM audio, compact disk, digital audio disk |
| T8 | ATRAC, MD, MD player, mini disk |
| Y | EDTV, MUSE, Y/C separating, Y/C separation, chromakey, composite color television signal, composite signal, composite television signal, flicker, sharpness |
| NOT APPLICABLE | CG, computer graphics, ink jet printer, polygon, texture area, texture mapping, texture pattern, video printer |

FIG. 8

| KEYWORD | EVALUATION SECTION | WEIGHTING |
|---|---|---|
| CD ROM player | T7 | 1.0 |
| CD player | T7 | 1.0 |
| DAD player | T7 | 1.0 |
| DVC | T6 | 1.0 |
| DVD player | T3 | 1.0 |
| DVD recorder | T4 | 1.0 |
| MD player | T8 | 1.0 |
| broadcasting satellite receiver | T1 | 0.5 |
| digital VCR | T6 | 0.5 |
| digital VTR | T6 | 0.5 |
| digital camcorder | T6 | 0.5 |
| digital camera | T5 | 0.5 |
| digital still camera | T5 | 0.5 |
| digital video camera | T5 | 0.5 |
| disk reproducing device | T3 | 0.5 |
| electronic camera | T5 | 0.5 |
| electronic still camera | T5 | 0.5 |
| ink jet printer | NOT APPLICABLE | 0.5 |
| satellite broadcasting receiver | T1 | 0.5 |
| satellite telecasting system | T1 | 0.5 |
| still video camera | T5 | 0.5 |
| television camera | T5 | 0.5 |
| transcoder | T4 | 0.5 |
| video disk player | T3 | 0.5 |
| video disk reproducing system | T3 | 0.5 |
| video printer | NOT APPLICABLE | 0.5 |

FIG. 9

| KEYWORD | EVALUATION SECTION | WEIGHTING |
|---|---|---|
| color temperature | Y | 0.1 |
| digital TV | T2 | 0.1 |
| television | Y | 0.1 |

FIG. 10

[root@localhost /root]# perl uspm41.pl
Start at Wed Aug 22 13:30:48 2001.
1, Open File Name: 05526045.TXT, selected section at stage 2 = T5
2, Open File Name: 05581362.TXT, selected section at stage 2 = T5
3, Open File Name: 05594550.TXT, selected section at stage 2 = T6
4, Open File Name: 05655051.TXT, selected section at stage 2 = T7
5, Open File Name: 05657098.TXT, selected section at stage 3 = Y
6, Open File Name: 05691819.TXT, selected section at stage 2 = T6
7, Open File Name: 05699125.TXT, selected section at stage 2 = T2
8, Open File Name: 05739853.TXT, selected section at stage 1 = T5
9, Open File Name: 05742341.TXT, selected section at stage 2 = T5
10, Open File Name: 05751375.TXT, selected section at stage 2 = Y
11, Open File Name: 05767845.TXT, selected section at stage 2 = T7
12, Open File Name: 05784107.TXT, selected section at stage 2 = T4
13, Open File Name: 05802241.TXT, selected section at stage 2 = T1
14, Open File Name: 05818435.TXT, selected section at stage 2 = T7
15, Open File Name: 05825421.TXT, selected section at stage 2 = T4
16, Open File Name: 05852446.TXT, selected section at stage 2 = NOT APPLICABLE
17, Open File Name: 05884004.TXT, selected section at stage 2 = T3
18, Open File Name: 05892879.TXT, selected section at stage 2 = T1
19, Open File Name: 05907659.TXT, selected section at stage 2 = T3
20, Open File Name: 05909255.TXT, selected section at stage 2 = Y
21, Open File Name: 05973681.TXT, selected section at stage 2 = T2
22, Open File Name: 05978032.TXT, selected section at stage 2 = T4
23, Open File Name: 05999696.TXT, selected section at stage 2 = T3
24, Open File Name: 06040864.TXT, selected section at stage 2 = T4
25, Open File Name: 06044198.TXT, selected section at stage 2 = T6
26, Open File Name: 06049651.TXT, selected section at stage 2 = T1
27, Open File Name: 06069667.TXT, selected section at stage 2 = T1
28, Open File Name: 06088507.TXT, selected section at stage 2 = T3
29, Open File Name: 06094455.TXT, selected section at stage 2 = T4
30, Open File Name: 06148136.TXT, selected section at stage 1 = T6
End at Wed Aug 22 13:31:48 2001.
[root@localhost /root]#

FIG. 11

| PATENT FILE | RECOMMENDED EVALUATION SECTION | PATENT FILE | RECOMMENDED EVALUATION SECTION | PATENT FILE | RECOMMENDED EVALUATION SECTION | PATENT FILE | RECOMMENDED EVALUATION SECTION |
|---|---|---|---|---|---|---|---|
| 05526045.TXT | T5 | 05581362.TXT | T5 | 05594550.TXT | T6 | 05655051.TXT | T7 |
| 05657098.TXT | Y | 05691819.TXT | T6 | 05699125.TXT | T2 | 05739853.TXT | T5 |
| 05742341.TXT | T5 | 05751375.TXT | Y | 05767845.TXT | T7 | 05784107.TXT | T4 |
| 05802241.TXT | T1 | 05818435.TXT | T7 | 05825421.TXT | T4 | 05852446.TXT | NOT APPLICABLE |
| 05884004.TXT | T3 | 05892879.TXT | T1 | 05907659.TXT | T3 | 05909255.TXT | Y |
| 05973681.TXT | T2 | 05978032.TXT | T4 | 05999696.TXT | T3 | 06040864.TXT | T4 |
| 06044198.TXT | T6 | 06049651.TXT | T1 | 06069667.TXT | T1 | 06088507.TXT | T3 |
| 06094455.TXT | T4 | 06148136.TXT | T6 | | | | |

FIG. 12

30, Open File Name: 06148136.TXT
Title: Recording apparatus, reproducing apparatus, and conversion apparatus
Issued Date: 20001114

Abstract: Among the recording/reproducing apparatus such as digital VCR, recording/reproducing and converting may be conducted using digital interface even if there are difference in the type of audio sampling and video compression. DV bus data is provided at digital I/F circuit 2, and A/V separator 101 separates the data into audio and video. The separated audio data undergoes the de-interleave processing at de-interleave instrument 102, and the rate conversion at rate converter 103. The rate- converted audio data undergoes the frame sequence processing and interleave processing at interleave instrument 104. While, the video data is delayed at delay memory 105, where the delay in the audio data processing is taken into account. These audio data and video data are multiplexed at A/V multiplexer 106 to output the DV bus data 3, which is recorded after having been applied with due processing for recording.

RECOMMENDED EVALUATION SECTION BY PRIORITY ASSIGNMENT

| SECTION | KEYWORD | OCCURRENCE COUNT |
|---------|---------|------------------|
| T6 | [RECOMMENDED SECTION] | — |
| T6 | digital VCR | 1 |

RECOMMENDED EVALUATION SECTION BY REGULAR ASSIGNMENT

| SECTION | KEYWORD | OCCURRENCE COUNT |
|---------|---------|------------------|
| T4 | high efficiency encoding | 21 |
| T6 | DVC | 12 |
| T1 | demodulator | 11 |
| T6 | digital VCR | 11 |
| T1 | modulator | 6 |
| T1 | modulation | 2 |

RECOMMENDED EVALUATION SECTION BY AUXILIARY ASSIGNMENT

| SECTION | KEYWORD | OCCURRENCE COUNT |
|---------|---------|------------------|
| — | NO KEYWORDS CORRESPONDING TO SECTIONS | — |

FIG. 13A

| RANK | WORD | OCCURRENCE COUNT | RANK | WORD | OCCURRENCE COUNT | RANK | WORD | OCCURRENCE COUNT | RANK | WORD | OCCURRENCE COUNT |
|---|---|---|---|---|---|---|---|---|---|---|---|
| 1 | data | 778 | 2 | audio | 265 | 3 | signal | 237 | 4 | video | 229 |
| 5 | mode | 216 | 6 | sampling | 214 | 7 | digital | 152 | 8 | inputted | 106 |
| 9 | converting | 105 | 10 | interface | 92 | 11 | recording | 92 | 12 | frequency | 87 |
| 13 | efficiency | 86 | 14 | high | 86 | 15 | de | 80 | 16 | interleaved | 75 |
| 17 | encoded | 71 | 18 | processing | 67 | 19 | functioning | 64 | 20 | delay | 61 |
| 21 | interleave | 60 | 22 | rate | 57 | 23 | detector | 56 | 24 | separating | 56 |
| 25 | separated | 55 | 26 | DV | 48 | 27 | format | 47 | 28 | switch | 47 |
| 29 | instrument | 46 | 30 | detecting | 45 | 31 | separator | 45 | 32 | converter | 44 |
| 33 | reproducing | 43 | 34 | converted | 42 | 35 | lock | 41 | 36 | outputting | 40 |
| 37 | Format | 39 | 38 | interleaving | 38 | 39 | bus | 35 | 40 | detected | 33 |
| 41 | KHz | 32 | 42 | frame | 32 | 43 | multiplexer | 32 | 44 | selecting | 32 |
| 45 | undergoes | 32 | 46 | delayed | 31 | 47 | delivered | 31 | 48 | multiplexing | 29 |
| 49 | memory | 28 | 50 | Embodiment | 28 | 51 | accordance | 27 | 52 | unlock | 27 |
| 53 | conversion | 26 | 54 | encoding | 26 | 55 | type | 25 | 56 | certain | 24 |
| 57 | correction | 24 | 58 | based | 23 | 59 | decoder | 23 | 60 | decoding | 23 |
| 61 | multiplexed | 23 | 62 | reproduced | 23 | 63 | sampled | 23 | 64 | sequence | 23 |
| 65 | specific | 22 | 66 | transmitted | 22 | 67 | decoded | 21 | 68 | error | 21 |
| 69 | interpolating | 21 | 70 | outputted | 21 | 71 | recorded | 21 | 72 | reverse | 21 |
| 73 | delaying | 19 | 74 | encoder | 19 | 75 | exemplary | 19 | 76 | medium | 19 |
| 77 | record | 19 | 78 | VCR | 18 | 79 | block | 18 | 80 | detection | 18 |
| 81 | filter | 18 | 82 | output | 18 | 83 | circuit | 17 | 84 | decimating | 17 |
| 85 | process | 17 | 86 | synchronized | 17 | 87 | direction | 16 | 88 | units | 16 |

FIG. 13B

| RANK | WORD | OCCUR-RENCE COUNT | RANK | WORD | OCCUR-RENCE COUNT | RANK | WORD | OCCUR-RENCE COUNT |
|---|---|---|---|---|---|---|---|---|
| 89 | selected | 15 | 90 | controller | 14 | 91 | information | 14 | 92 | reproduction | 14 |
| 93 | samples | 14 | 94 | showing | 14 | 95 | structure | 14 | 96 | applied | 13 |
| 97 | connecting | 13 | 98 | DVCPRO | 12 | 99 | band | 12 | 100 | difference | 12 |
| 101 | horizontal | 12 | 102 | performs | 12 | 103 | restriction | 12 | 104 | similar | 12 |
| 105 | tape | 12 | 106 | width | 11 | 107 | consideration | 11 | 108 | delays | 11 |
| 109 | demodulator | 11 | 110 | number | 11 | 111 | selector | 11 | 112 | taking | 11 |
| 113 | amplifier | 10 | 114 | bandwidth | 10 | 115 | colour | 10 | 116 | magnetic | 10 |
| 117 | parity | 10 | 118 | pixel | 10 | 119 | restricting | 10 | 120 | terminal | 10 |
| 121 | compression | 9 | 122 | constitution | 9 | 123 | decimate | 9 | 124 | external | 9 |
| 125 | implement | 9 | 126 | interpolate | 9 | 127 | judging | 9 | 128 | original | 9 |
| 129 | sample | 9 | 130 | selects | 9 | 131 | comming | 8 | 132 | denotes | 8 |
| 133 | interpolated | 8 | 134 | numeral | 8 | 135 | possible | 8 | 136 | regardless | 8 |
| 137 | series | 8 | 138 | transmitting | 8 | 139 | course | 8 | 140 | decimated | 7 |
| 141 | established | 7 | 142 | form | 7 | 143 | switching | 7 | 144 | Digital | 7 |
| 145 | again | 6 | 146 | application | 6 | 147 | arrangement | 6 | 148 | comprised | 6 |
| 149 | constituent | 6 | 150 | different | 6 | 151 | elements | 6 | 152 | even | 6 |
| 153 | judged | 6 | 154 | modulator | 6 | 155 | omitted | 6 | 156 | purpose | 6 |
| 157 | receiving | 6 | 158 | represented | 6 | 159 | section | 6 | 160 | symbols | 6 |
| 161 | adds | 5 | 162 | applying | 5 | 163 | demodulated | 5 | 164 | drawback | 5 |
| 165 | frames | 5 | 166 | hand | 5 | 167 | input | 5 | 168 | line | 5 |
| 169 | referred | 5 | 170 | selectively | 5 | 171 | synchronization | 5 | 172 | undergone | 5 |
| 173 | unit | 5 | 174 | various | 5 | | | | | | |

FIG. 14

7, Open File Name: 05699125.TXT
Title: Electronic television program guide for a television system having two tuners
Issued Date: 19971216

Abstract: A method and device for receiving and storing an electronic television (TV) program guide. In a satellite, cable or broadcast TV system, electronic TV program guides may be coded into the video signals received by the TV receiver. Many currently available TV receivers also allow users to program a list of "select-channels." When the receiver is in its select-channel mode, the receiver only tunes to the channels the user stored in the list of select channels. The present invention limits the memory and processing power required to store an electronic TV program guide by only storing program guide information associated with the channels stored by the user in connection with the select-channels function of the receiver. In receivers having a second tuner, the second tuner may be used to automatically update the stored program guide.

RECOMMENDED EVALUATION SECTION BY PRIORITY ASSIGNMENT

| SECTION | KEYWORD | OCCURRENCE COUNT |
|---|---|---|
| UNDECIDED | [RECOMMENDED SECTION] | — |
| — | NO KEYWORDS CORRESPONDING TO SECTIONS | — |

RECOMMENDED EVALUATION SECTION BY REGULAR ASSIGNMENT

| SECTION | KEYWORD | OCCURRENCE COUNT |
|---|---|---|
| T2 | [RECOMMENDED SECTION] | — |
| T2 | electronic TV program guide | 20 |
| T2 | EPG | 2 |

RECOMMENDED EVALUATION SECTION BY AUXILIARY ASSIGNMENT

| SECTION | KEYWORD | OCCURRENCE COUNT |
|---|---|---|
| Y | television | 12 |

FIG. 15

5, Open File Name: 05657098.TXT
Title: Control circuit for use with a cut-off adjusting circuit and a drive adjusting circuit
Issued Date: 19970812

Abstract: Control circuits for the cut-off and drive control of video equipment. A first control device includes a cut-off control circuit and drive control circuit for use in conventional modes. A second control device includes a cut-off control circuit for mode switching and a drive control circuit for mode switching, independent of the first control device. The cut-off and drive adjustments made for every mode switching operation are unnecessary, and the mode switching based on off set data is possible.

RECOMMENDED EVALUATION SECTION BY PRIORITY ASSIGNMENT

| SECTION | KEYWORD | OCCURRENCE COUNT |
|---|---|---|
| UNDECIDED | [RECOMMENDED SECTION] | — |
| — | NO KEYWORDS CORRESPONDING TO SECTIONS | — |

RECOMMENDED EVALUATION SECTION BY REGULAR ASSIGNMENT

| SECTION | KEYWORD | OCCURRENCE COUNT |
|---|---|---|
| UNDECIDED | [RECOMMENDED SECTION] | — |
| — | NO KEYWORDS CORRESPONDING TO SECTIONS | — |

RECOMMENDED EVALUATION SECTION BY AUXILIARY ASSIGNMENT

| SECTION | KEYWORD | OCCURRENCE COUNT |
|---|---|---|
| Y | [RECOMMENDED SECTION] | — |
| Y | color temperature | 18 |
| Y | television | 4 |

FIG. 16

| PATENT FILE | T1 | T2 | T3 | T4 | T5 | T6 | T7 | Y | NOT APPLICABLE |
|---|---|---|---|---|---|---|---|---|---|
| 05526045.TXT | 2 | 0 | 0 | 0 | 142 | 0 | 36 | 0.5 | 0 |
| 05581362.TXT | 0 | 0 | 0 | 0 | 34.5 | 0 | 7 | 0.5 | 2 |
| 05594550.TXT | 0 | 0 | 0.5 | 0 | 0 | 2.5 | 0 | 1 | 0 |
| 05655051.TXT | 0 | 0 | 0.5 | 0 | 0 | 0 | 31.5 | 0 | 0 |
| 05657098.TXT | 0 | 0 | 0 | 0 | 0 | 0 | 0 | 11 | 0 |
| 05691819.TXT | 0 | 0 | 0 | 19 | 0 | 35.5 | 0 | 0 | 0 |
| 05699125.TXT | 0 | 12 | 0 | 0 | 0 | 0 | 1 | 0 | 0 |
| 05739853.TXT | 0 | 0 | 0 | 0 | 1 | 0 | 0 | 0 | 0 |
| 05742341.TXT | 0 | 0 | 0 | 0 | 54 | 0 | 0 | 0 | 0 |
| 05751375.TXT | 0 | 0 | 0 | 0 | 0 | 0 | 1 | 79 | 0 |
| 05767845.TXT | 0 | 0 | 11 | 0 | 0 | 0 | 59 | 0 | 0 |
| 05784107.TXT | 0 | 0 | 0 | 36.5 | 0 | 0 | 0 | 0 | 0 |
| 05802241.TXT | 674.5 | 0 | 0 | 2.5 | 0 | 0.5 | 68 | 10 | 0 |
| 05818435.TXT | 0 | 0 | 0.5 | 0 | 0 | 0 | 3 | 0 | 0 |
| 05825421.TXT | 0 | 0 | 0 | 71.5 | 0 | 0 | 0 | 0 | 0 |
| 05852446.TXT | 0 | 0 | 0 | 2.5 | 0 | 0 | 0 | 0 | 168.5 |
| 05884004.TXT | 0 | 0 | 123.5 | 1 | 0.5 | 0 | 48 | 0 | 2.5 |
| 05892879.TXT | 504.5 | 0 | 0 | 2.5 | 0 | 0.5 | 63 | 9 | 0 |
| 05907659.TXT | 2 | 0 | 96.5 | 1 | 0.5 | 0 | 4 | 0 | 2 |
| 05909255.TXT | 0 | 0 | 0 | 0 | 0 | 0 | 0 | 39 | 0 |
| 05973681.TXT | 0 | 4 | 0 | 0 | 0 | 0 | 0 | 0 | 0 |
| 05978032.TXT | 0 | 0 | 0 | 73.5 | 0 | 0 | 0 | 0 | 0 |
| 05999696.TXT | 1 | 0 | 44.5 | 0 | 0 | 0 | 14 | 0 | 2 |
| 06040864.TXT | 0 | 0 | 0 | 120.5 | 0 | 0.5 | 0 | 0 | 0 |
| 06044198.TXT | 6 | 0 | 1 | 30.5 | 0 | 51 | 0 | 0 | 0 |
| 06049651.TXT | 488 | 0 | 0 | 2.5 | 0 | 0.5 | 63 | 9 | 0 |
| 06069667.TXT | 5 | 0 | 0 | 0 | 0 | 0 | 0 | 0 | 0 |
| 06088507.TXT | 1 | 0 | 50 | 1 | 0 | 0 | 13 | 0 | 0 |
| 06094455.TXT | 0 | 0 | 0 | 146 | 0 | 0 | 0 | 0 | 0 |
| 06148136.TXT | 0 | 0 | 0 | 0 | 0 | 0.5 | 0 | 0 | 0 |

FIG. 18

| PATENT FILE | EVALUATION SECTION | PATENT CLASSIFICATION CODE |
|---|---|---|
| 05526045.TXT | T5 | 348/208; 348/229; 348/296 |
| 05581362.TXT | T5 | 386/95; 358/90,91; 348/207; 386/117 |
| 05594550.TXT | T6 | 386/40; 360/32; 360/48; 348/423; 348/420; 386/124 |
| 05655051.TXT | T7 | 386/105; 386/106; 386/69; 360/722 |
| 05657098.TXT | Y | 348/645; 348/655; 348/689; 348/696 |
| 05691819.TXT | T6 | 358/310; 358/335; 360/32; 360/48 |
| 05699125.TXT | T2 | 348/563; 348/565; 348/906 |
| 05739853.TXT | T5 | 348/335; 348/374 |
| 05742341.TXT | T5 | 348/373; 348/333; 348/375; 348/376; 396/374; 358/906 |
| 05751375.TXT | Y | 348/571; 348/715; 348/721; 348/718; 348/719; 348/555 |
| 05767845.TXT | T7 | 345/302; 345/475 |
| 05784107.TXT | T4 | 348/412; 348/415 |
| 05802241.TXT | T1 | 386/46; 348/723 |
| 05818435.TXT | T7 | 345/302 |
| 05825421.TXT | T4 | 348/409; 348/413; 348/415; 348/699 |
| 05852446.TXT | NOT APPLICABLE | 345/441 |
| 05884004.TXT | T3 | 386/98; 386/111; 386/126 |
| 05892879.TXT | T1 | 386/46; 348/726 |
| 05907659.TXT | T3 | 386/95; 386/125; 386/126; 369/47 |
| 05909255.TXT | Y | 348/663; 348/631 |
| 05973681.TXT | T2 | 345/327; 348/6; 348/10; 348/473; 348/564; 455/41; 455/62 |
| 05978032.TXT | T4 | 348/416; 348/699 |
| 05999696.TXT | T3 | 386/98; 386/126; 386/125 |
| 06040864.TXT | T4 | 348/416; 348/397; 348/699 |
| 06044198.TXT | T6 | 386/98; 386/46; 386/52; 348/705; 358/906 |
| 06049651.TXT | T1 | 386/46; 386/123; 348/726 |
| 06069667.TXT | T1 | 348/525; 348/525; 348/530; 348/531; 348/533; 375/368; 375/365 |
| 06088507.TXT | T3 | 386/95; 386/98; 386/126 |
| 06094455.TXT | T4 | 375/240; 348/405; 348/419 |
| 06148136.TXT | T6 | 386/46; 386/131; 348/441 |

FIG. 19A

| PATENT CLASSIFICATION CODE | T1 | T2 | T3 | T4 | T5 | T6 | T7 | T8 | Y | NOT APPLICABLE |
|---|---|---|---|---|---|---|---|---|---|---|
| 345/302 | 0 | 0 | 0 | 0 | 0 | 0 | 2 | 0 | 0 | 0 |
| 345/327 | 0 | 1 | 0 | 0 | 0 | 0 | 0 | 0 | 0 | 0 |
| 345/441 | 0 | 0 | 0 | 0 | 0 | 0 | 0 | 0 | 0 | 1 |
| 345/475 | 0 | 1 | 0 | 0 | 0 | 0 | 1 | 0 | 0 | 0 |
| 348/6 | 0 | 1 | 0 | 0 | 0 | 0 | 0 | 0 | 0 | 0 |
| 348/10 | 0 | 0 | 0 | 0 | 1 | 0 | 0 | 0 | 0 | 0 |
| 348/207 | 0 | 0 | 0 | 0 | 1 | 0 | 0 | 0 | 0 | 0 |
| 348/208 | 0 | 0 | 0 | 0 | 1 | 0 | 0 | 0 | 0 | 0 |
| 348/229 | 0 | 0 | 0 | 0 | 1 | 0 | 0 | 0 | 0 | 0 |
| 348/296 | 0 | 0 | 0 | 0 | 1 | 0 | 0 | 0 | 0 | 0 |
| 348/333 | 0 | 0 | 0 | 0 | 1 | 0 | 0 | 0 | 0 | 0 |
| 348/335 | 0 | 0 | 0 | 0 | 1 | 0 | 0 | 0 | 0 | 0 |
| 348/373 | 0 | 0 | 0 | 1 | 0 | 0 | 0 | 0 | 0 | 0 |
| 348/374 | 0 | 0 | 0 | 1 | 0 | 0 | 0 | 0 | 0 | 0 |
| 348/375 | 0 | 0 | 0 | 1 | 0 | 0 | 0 | 0 | 0 | 0 |
| 348/376 | 0 | 0 | 0 | 1 | 0 | 0 | 0 | 0 | 0 | 0 |
| 348/397 | 0 | 0 | 0 | 0 | 0 | 0 | 0 | 0 | 0 | 0 |
| 348/405 | 0 | 0 | 0 | 0 | 0 | 0 | 0 | 0 | 0 | 0 |
| 348/409 | 0 | 0 | 0 | 0 | 0 | 0 | 0 | 0 | 0 | 0 |
| 348/412 | 0 | 0 | 0 | 0 | 0 | 0 | 0 | 0 | 0 | 0 |
| 348/413 | 0 | 0 | 0 | 0 | 0 | 0 | 0 | 0 | 0 | 0 |

FIG. 19B

| PATENT CLASSIFICATION CODE | T1 | T2 | T3 | T4 | T5 | T6 | T7 | T8 | Y | NOT APPLICABLE |
|---|---|---|---|---|---|---|---|---|---|---|
| 348/415 | 0 | 0 | 0 | 2 | 0 | 0 | 0 | 0 | 0 | 0 |
| 348/416 | 0 | 0 | 0 | 2 | 0 | 0 | 0 | 0 | 0 | 0 |
| 348/419 | 0 | 0 | 0 | 1 | 0 | 0 | 0 | 0 | 0 | 0 |
| 348/420 | 0 | 0 | 0 | 0 | 0 | 1 | 0 | 0 | 0 | 0 |
| 348/423 | 0 | 0 | 0 | 0 | 0 | 1 | 0 | 0 | 0 | 0 |
| 348/441 | 0 | 1 | 0 | 0 | 0 | 0 | 0 | 0 | 0 | 0 |
| 348/473 | 1 | 0 | 0 | 0 | 0 | 0 | 0 | 0 | 0 | 0 |
| 348/525 | 1 | 0 | 0 | 0 | 0 | 0 | 0 | 0 | 0 | 0 |
| 348/530 | 1 | 0 | 0 | 0 | 0 | 0 | 0 | 0 | 0 | 0 |
| 348/531 | 0 | 0 | 0 | 0 | 0 | 0 | 0 | 0 | 0 | 0 |
| 348/533 | 0 | 1 | 0 | 0 | 0 | 0 | 0 | 0 | 0 | 0 |
| 348/555 | 0 | 1 | 0 | 0 | 0 | 0 | 0 | 0 | 0 | 0 |
| 348/563 | 0 | 1 | 0 | 0 | 0 | 0 | 0 | 0 | 0 | 0 |
| 348/564 | 0 | 0 | 0 | 0 | 0 | 0 | 0 | 0 | 1 | 0 |
| 348/565 | 0 | 0 | 0 | 0 | 0 | 0 | 0 | 0 | 0 | 0 |
| 348/571 | 0 | 0 | 0 | 0 | 0 | 0 | 0 | 0 | 1 | 0 |
| 348/631 | 0 | 0 | 0 | 0 | 0 | 0 | 0 | 0 | 1 | 0 |
| 348/645 | 0 | 0 | 0 | 0 | 0 | 0 | 0 | 0 | 1 | 0 |
| 348/655 | 0 | 0 | 0 | 0 | 0 | 0 | 0 | 0 | 1 | 0 |
| 348/663 | 0 | 0 | 0 | 0 | 0 | 0 | 0 | 0 | 1 | 0 |

FIG. 19C

| PATENT CLASSIFICATION CODE | T1 | T2 | T3 | T4 | T5 | T6 | T7 | T8 | Y | NOT APPLICABLE |
|---|---|---|---|---|---|---|---|---|---|---|
| 348/689 | 0 | 0 | 0 | 0 | 0 | 0 | 0 | 0 | 1 | 0 |
| 348/696 | 0 | 0 | 0 | 0 | 0 | 0 | 0 | 0 | 1 | 0 |
| 348/699 | 0 | 0 | 0 | 3 | 0 | 0 | 0 | 0 | 0 | 0 |
| 348/705 | 0 | 0 | 0 | 0 | 0 | 1 | 0 | 0 | 0 | 0 |
| 348/715 | 0 | 0 | 0 | 0 | 0 | 0 | 0 | 0 | 1 | 0 |
| 348/718 | 0 | 0 | 0 | 0 | 0 | 0 | 0 | 0 | 1 | 0 |
| 348/719 | 0 | 0 | 0 | 0 | 0 | 0 | 0 | 0 | 1 | 0 |
| 348/721 | 1 | 0 | 0 | 0 | 0 | 0 | 0 | 0 | 0 | 0 |
| 348/723 | 2 | 1 | 0 | 0 | 0 | 1 | 0 | 0 | 0 | 0 |
| 348/726 | 0 | 0 | 0 | 0 | 0 | 1 | 0 | 0 | 0 | 0 |
| 348/906 | 0 | 0 | 0 | 0 | 1 | 0 | 0 | 0 | 0 | 0 |
| 358/310 | 0 | 0 | 0 | 0 | 1 | 0 | 0 | 0 | 0 | 0 |
| 358/335 | 0 | 0 | 0 | 0 | 0 | 2 | 0 | 0 | 0 | 0 |
| 358/906 | 0 | 0 | 1 | 0 | 0 | 2 | 0 | 0 | 0 | 0 |
| 358/90,91 | 0 | 0 | 0 | 0 | 0 | 0 | 1 | 0 | 0 | 0 |
| 360/32 | 0 | 0 | 0 | 1 | 0 | 0 | 0 | 0 | 0 | 0 |
| 360/48 | 0 | 0 | 0 | 0 | 0 | 0 | 0 | 0 | 0 | 0 |
| 369/47 | 0 | 0 | 0 | 0 | 0 | 0 | 0 | 0 | 0 | 0 |
| 375/240 | 0 | 0 | 0 | 0 | 0 | 0 | 0 | 0 | 0 | 0 |
| 375/365 | 1 | 0 | 0 | 0 | 0 | 0 | 0 | 0 | 0 | 0 |

FIG. 19D

| PATENT CLASSIFICATION CODE | T1 | T2 | T3 | T4 | T5 | T6 | T7 | T8 | Y | NOT APPLICABLE |
|---|---|---|---|---|---|---|---|---|---|---|
| 375/366 | 1 | 0 | 0 | 0 | 0 | 0 | 0 | 0 | 0 | 0 |
| 375/368 | 1 | 0 | 0 | 0 | 0 | 0 | 0 | 0 | 0 | 0 |
| 386/40 | 0 | 0 | 0 | 0 | 0 | 1 | 0 | 0 | 0 | 0 |
| 386/46 | 3 | 0 | 0 | 0 | 0 | 2 | 0 | 0 | 0 | 0 |
| 386/52 | 0 | 0 | 0 | 0 | 0 | 1 | 1 | 0 | 0 | 0 |
| 386/69 | 0 | 0 | 2 | 0 | 1 | 0 | 0 | 0 | 0 | 0 |
| 386/95 | 0 | 0 | 3 | 0 | 0 | 1 | 1 | 0 | 0 | 0 |
| 386/98 | 0 | 0 | 0 | 0 | 0 | 0 | 1 | 0 | 0 | 0 |
| 386/105 | 0 | 0 | 1 | 0 | 0 | 0 | 0 | 0 | 0 | 0 |
| 386/106 | 0 | 0 | 0 | 0 | 1 | 0 | 0 | 0 | 0 | 0 |
| 386/111 | 1 | 0 | 0 | 0 | 0 | 0 | 0 | 0 | 0 | 0 |
| 386/117 | 0 | 0 | 2 | 0 | 0 | 1 | 0 | 0 | 0 | 0 |
| 386/123 | 0 | 0 | 4 | 0 | 0 | 0 | 0 | 0 | 0 | 0 |
| 386/124 | 0 | 0 | 0 | 0 | 0 | 0 | 0 | 0 | 0 | 0 |
| 386/125 | 0 | 0 | 0 | 0 | 1 | 1 | 0 | 0 | 0 | 0 |
| 386/126 | 0 | 0 | 0 | 0 | 0 | 0 | 0 | 0 | 0 | 0 |
| 386/131 | 0 | 1 | 0 | 0 | 0 | 0 | 0 | 0 | 0 | 0 |
| 396/374 | 0 | 1 | 0 | 0 | 0 | 0 | 0 | 0 | 0 | 0 |
| 455/41 | 0 | 0 | 0 | 0 | 0 | 0 | 0 | 0 | 0 | 0 |
| 455/62 | 0 | 0 | 0 | 0 | 0 | 0 | 0 | 0 | 0 | 0 |

FIG. 20A

| PATENT CLASSIFICATION CODE | EVALUATION SECTION |
|---|---|
| 345/302 | T7 |
| 345/327 | T2 |
| 345/441 | NOT APPLICABLE |
| 345/475 | T7 |
| 348/6 | T2 |
| 348/10 | T2 |
| 348/207 | T5 |
| 348/208 | T5 |
| 348/229 | T5 |
| 348/296 | T5 |
| 348/333 | T5 |
| 348/335 | T5 |
| 348/373 | T5 |
| 348/374 | T5 |
| 348/375 | T5 |
| 348/376 | T5 |
| 348/397 | T4 |
| 348/405 | T4 |
| 348/409 | T4 |
| 348/412 | T4 |
| 348/413 | T4 |
| 348/415 | T4 |
| 348/416 | T4 |
| 348/419 | T4 |
| 348/420 | T6 |
| 348/423 | T6 |
| 348/441 | T6 |
| 348/473 | T2 |
| 348/525 | T1 |
| 348/530 | T1 |
| 348/531 | T1 |
| 348/533 | T1 |
| 348/555 | Y |
| 348/563 | T2 |
| 348/564 | T2 |

FIG. 20B

| PATENT CLASSIFICATION CODE | EVALUATION SECTION |
|---|---|
| 348/565 | T2 |
| 348/571 | Y |
| 348/631 | Y |
| 348/645 | Y |
| 348/655 | Y |
| 348/663 | Y |
| 348/689 | Y |
| 348/696 | Y |
| 348/699 | T4 |
| 348/705 | T6 |
| 348/715 | Y |
| 348/718 | Y |
| 348/719 | Y |
| 348/721 | Y |
| 348/723 | T1 |
| 348/726 | T1 |
| 348/906 | T2 |
| 358/310 | T6 |
| 358/335 | T6 |
| 358/906 | T5, T6 |
| 358/90,91 | T5 |
| 360/32 | T6 |
| 360/48 | T6 |
| 360/722 | T7 |
| 369/47 | T3 |
| 375/240 | T4 |
| 375/365 | T1 |
| 375/366 | T1 |
| 375/368 | T1 |
| 386/40 | T6 |
| 386/46 | T1 |
| 386/52 | T6 |
| 386/69 | T7 |
| 386/95 | T3 |
| 386/98 | T3 |

FIG. 20C

| PATENT CLASSIFICATION CODE | EVALUATION SECTION |
|---|---|
| 386/105 | T7 |
| 386/106 | T7 |
| 386/111 | T3 |
| 386/117 | T5 |
| 386/123 | T1 |
| 386/124 | T6 |
| 386/125 | T3 |
| 386/126 | T3 |
| 386/131 | T6 |
| 396/374 | T5 |
| 455/41 | T2 |
| 455/62 | T2 |

FIG. 21

| EVALUATION SECTION | PATENT CLASSIFICATION CODE |
|---|---|
| T1 | 348/525; 348/530; 348/531; 348/533; 348/723; 348/726; 375/365; 375/366; 375/368; 386/46; 386/123 |
| T2 | 345/327; 348/6; 348/10; 348/473; 348/563; 348/564; 348/565; 348/906; 455/41; 455/62 |
| T3 | 369/47; 386/95; 386/98; 386/111; 386/125; 386/126 |
| T4 | 348/397; 348/405; 348/409; 348/412; 348/413; 348/415; 348/416; 348/419; 348/699; 375/240 |
| T5 | 348/207; 348/208; 348/229; 348/296; 348/333; 348/335; 348/373; 348/374; 348/375; 348/376; 358/906; 358/90,91; 386/117; 396/374 |
| T6 | 348/420; 348/423; 348/441; 348/705; 358/310; 358/335; 358/906; 360/32; 360/48; 386/40; 386/52; 386/124; 386/131 |
| T7 | 345/302; 345/475; 360/722; 386/69; 386/105; 386/106 |
| T8 |   |
| Y | 348/555; 348/571; 348/631; 348/645; 348/655; 348/663; 348/689; 348/696; 348/715; 348/718; 348/719; 348/721 |
| NOT APPLICABLE | 345/441 |

FIG. 23

```
[root@localhost /root]# perl uspm5.pl
Start at Wed Aug 22 13:27:21 2001.
1, Open File Name: 05526045.TXT, selected section = T5
2, Open File Name: 05581362.TXT, selected section = T5
3, Open File Name: 05594550.TXT, selected section = T6
4, Open File Name: 05655051.TXT, selected section = T7
5, Open File Name: 05657098.TXT, selected section = Y
6, Open File Name: 05691819.TXT, selected section = T6
7, Open File Name: 05699125.TXT, selected section = T2
8, Open File Name: 05739853.TXT, selected section = T5
9, Open File Name: 05742341.TXT, selected section = T5
10, Open File Name: 05751375.TXT, selected section = Y
11, Open File Name: 05767845.TXT, selected section = T7
12, Open File Name: 05784107.TXT, selected section = T4
13, Open File Name: 05802241.TXT, selected section = T1
14, Open File Name: 05818435.TXT, selected section = T7
15, Open File Name: 05825421.TXT, selected section = T4
16, Open File Name: 05852446.TXT, selected section = NOT APPLICABLE
17, Open File Name: 05884004.TXT, selected section = T3
18, Open File Name: 05892879.TXT, selected section = T1
19, Open File Name: 05907659.TXT, selected section = T3
20, Open File Name: 05909255.TXT, selected section = Y
21, Open File Name: 05973681.TXT, selected section = T2
22, Open File Name: 05978032.TXT, selected section = T4
23, Open File Name: 05999696.TXT, selected section = T3
24, Open File Name: 06040864.TXT, selected section = T4
25, Open File Name: 06044198.TXT, selected section = T6
26, Open File Name: 06049651.TXT, selected section = T1
27, Open File Name: 06069667.TXT, selected section = T1
28, Open File Name: 06088507.TXT, selected section = T3
29, Open File Name: 06094455.TXT, selected section = T4
30, Open File Name: 06148136.TXT, selected section = T6
End at Wed Aug 22 13:27:21 2001.
[root@localhost /root]#
```

FIG. 24

25, Open File Name: 06044198.TXT
Title: Digital signal recording/reproducing device with editor
Issued Date: 20000328

Abstract: Disclosed is a digital signal recording and reproducing device for recording and reproducing a digital video signal. High efficiency encoding means encodes a digital video signal at a high efficiency, and recording means executes a predetermined encoding process for recording on the video data encoded at a high efficiency and records the video data obtained after the encoding process on a recording medium. On the other hand, reproducing means reproduces the video data recorded on the recording medium, executes a predetermined reproduced data processing for reproduction on reproduced video data and then outputs the video data obtained after the reproduced data processing. Delay means delays the video data outputted from the high efficiency encoding means by a delay time of a total of a delay time of the video data relevant to the processing of the recording means and a delay time of the video data relevant to the processing of the reproducing means, and outputs delayed video data, and selecting means selectively switches over between the video data outputted from the delay means and the video data outputted from the reproducing means, and outputs selected one of the two video data.

RECOMMENDED EVALUATION SECTION BY U.S. PATENT CLASSIFICATION CODE

| SECTION | OCCURRENCE COUNT | SUM OF OCCURRENCE COUNTS |
|---|---|---|
| T6 | [RECOMMENDED SECTION] | — |
| T1 | 0 0 0 1 0 0 0 0 0 0 | 1 |
| T2 | 0 0 0 0 0 0 0 0 0 0 | 0 |
| T3 | 0 0 1 0 0 0 | 1 |
| T4 | 0 0 0 0 0 0 0 0 0 | 0 |
| T5 | 0 0 0 0 0 0 0 0 0 0 1 0 | 1 |
| T6 | 0 0 0 0 0 0 1 0 0 1 0 0 1 | 3 |
| T7 | 0 0 0 0 0 0 | 0 |
| T8 | — | — |
| Y | 0 0 0 0 0 0 0 0 0 0 0 0 | 0 |
| NOT APPLICABLE | 0 | 0 |

FIG. 25

| ENVIRONMENT IN WHICH ASSIGNMENT SYSTEM IS EXECUTED | ASSIGNMENT BY KEYWORDS WITH WORD ANALYSIS | ASSIGNMENT BY KEYWORDS WITHOUT WORD ANALYSIS | ASSIGNMENT BY PATENT CLASSIFICATION CODE |
|---|---|---|---|
| CPU 333 MHz, MEMORY 384 MB, HARD-DISK 30 GB | 114 SEC | 48.3 SEC | 0.34 SEC |
| CPU 600 MHz, MEMORY 512 MB, HARD-DISK 20 GB | 59.7 SEC | 27.0 SEC | 0.17 SEC |
| CPU 1 GHz, MEMORY 512 MB, HARD-DISK 40 GB | 37.7 SEC | 16.2 SEC | 0.12 SEC |

FILE VOLUME OF THE 30 U.S. PATENTS: 3.11 MB

FIG. 26

| ENVIRONMENT IN WHICH ASSIGNMENT SYSTEM IS EXECUTED | ASSIGNMENT BY KEYWORDS WITH WORD ANALYSIS | ASSIGNMENT BY KEYWORDS WITHOUT WORD ANALYSIS | ASSIGNMENT BY PATENT CLASSIFICATION CODE |
|---|---|---|---|
| CPU 333 MHz, MEMORY 384 MB, HARD-DISK 30 GB | 10H 33MIN 20SEC | 4H 28MIN 20SEC | 1MIN 53SEC |
| CPU 600 MHz, MEMORY 512 MB, HARD-DISK 20 GB | 5H 31MIN 40SEC | 2H 30MIN | 56.7SEC |
| CPU 1 GHz, MEMORY 512 MB, HARD-DISK 40 GB | 3H 29MIN 27SEC | 1H 30MIN | 40SEC |

FILE VOLUME OF THE 10,000 U.S. PATENTS: 1.037 GB

FIG. 28A

| NAME | EVALUATION SECTION |
|---|---|
| Ando, Hiroshi | Y |
| Cooke, Phil | T7 |
| Endo, Koichiro | T7 |
| Endo, Satoshi | T7 |
| Etoh, Minoru | T4 |
| Fletcher, Paul | T7 |
| Fukushima, Yoshihisa | T3 |
| Furuta, Noriaki | T7 |
| Gimber, Tobin L. | T2 |
| Hamasaka, Hiroshi | T3 |
| Hasebe, Takumi | T3 |
| Hasegawa, Katsuya | Y |
| Hatano, Takahisa | Y |
| Hirai, Junichi | T2 |
| Horiike, Kazuyoshi | T3 |
| Igarashi, Yoshiaki | T5 |
| Iketani, Akira | T6 |
| Inoue, Mitsuhiro | T7 |
| Inoue, Shuji | T4 |
| Izaki, Masataka | T5 |
| Juri, Tatsuro | T6 |
| Kajino, Jirou | T5 |
| Katta, Noboru | T4 |
| Kawahara, Chihiro | T7 |
| Kawai, Masahiro | T7 |
| Kinugawa, Hiroki | Y |
| Konishi, Takaaki | T1 |
| Kozuka, Masayuki | T3 |
| Kusumi, Yuki | T7 |
| Matsumi, Chiyoko | T6 |
| McGill, Gary | T7 |
| Mitani, Hiroshi | T5 |
| Miwa, Katsuhiko | T3 |
| Miyabe, Yoshiyuki | T2 |
| Miyake, Jiro | Y |
| Mori, Yoshihiro | T3 |
| Morishita, Seiki | T5 |

FIG. 28B

| NAME | EVALUATION SECTION |
|---|---|
| Moriyasu, Yoshitada | T5 |
| Murase, Kaoru | T3 |
| Nakayama, Masaaki | T5 |
| Ninomiya, Kazuki | Y |
| Nishiyama, Tamotsu | Y |
| Oashi, Masahiro | T7 |
| Ohishi, Masayuki | T5 |
| Ohno, Tetsuya | T5 |
| Okamura, Kazuo | T2 |
| Oshima, Mitsuaki | T1 |
| Otaka, Hideki | T6 |
| Rogers, Mark | T7 |
| Rzeszewski, Theodore S. | T2 |
| Saeki, Shinichi | T3 |
| Sakamoto, Noriyuki | T7 |
| Sakaue, Shigeo | T5 |
| Sasada, Masahiko | Y |
| Sasaki, Ryoichi | T7 |
| Sato, Akihiro | T3 |
| Shimazu, Kouji | T7 |
| Suzuki, Kazuyoshi | T5 |
| Takahashi, Masami | T5 |
| Takahashi, Toshiya | T4 |
| Tan, Thiow Keng | T4 |
| Tanaka, Shinya | T6 |
| Tanigawa, Hidekazu | T2 |
| Togawa, Shinichi | T6 |
| Tomikawa, Shouzou | T5 |
| Tsuga, Kazuhiro | T3 |
| Uchida, Hirofumi | T6 |
| Ueda, Kazuya | T1 |
| Yamada, Yasutaka | T7 |
| Yamamoto, Shusaku | T5 |
| Yamauchi, Kazuhiko | T3 |
| Yoshida, Takayasu | T6 |
| Yukitake, Takeshi | T4 |

FIG. 29

| TEAM NAME | MEMBERS |
|---|---|
| T1 | Konishi, Takaaki; Oshima, mitsuaki; Ueda, Kazuya |
| T2 | Gimber, Tobin L.; Hirai, Junichi; Miyabe, Yoshiyuki; Okamura, Kazuo; Rzeszewski, Theodore S.; Tanigawa, Hidekazu |
| T3 | Fukushima, Yoshihisa; Hamasaka, Hiroshi; Hasebe, Takumi; Horiike, Kazuyoshi Kozuka, Masayuki; Miwa, Katsuhiko; Mori, Yoshihiro; Murase, Kaoru Saeki, Shinichi; Sato, Akihiro; Tsuga, Kazuhiro; Yamauchi, Kazuhiko |
| T4 | Etoh, Minoru; Inoue, Shuji; Katta, Noboru; Takahashi, Toshiya; Tan, Thiow Keng; Yukitake, Takeshi |
| T5 | Igarashi, Yoshiaki; Izaki, Masataka; Kajino, Jirou; Mitani, Hiroshi; Morishita, Seiki; Moriyasu, Yoshitada; Nakayama, Masaaki; Ohishi, Masayuki; Ohno, Tetsuya; Sakaue, Shigeo; Suzuki, Kazuyoshi; Takahashi, Masami; Tomikawa, Shouzou; Yamamoto, Shusaku |
| T6 | Iketani, Akira; Juri, Tatsuro; Matsumi, Chiyoko; Otaka, Hideki; Tanaka, Shinya; Togawa, Shinichi; Uchida, Hirofumi; Yoshida, Takayasu |
| T7 | Cooke, Phil; Endo, Koichiro; Endo, Satoshi; Fletcher, Paul; Furuta, Noriaki; Inoue,Mitsuhiro; Kawahara, Chihiro; Kawai, Masahiro; Kusumi, Yuki; McGill, Gary; Oashi, Masahiro; Rogers, Mark; Sakamoto, Noriyuki; Sasaki, Ryoichi; Shimazu, Kouji; Yamada, Yasutaka |
| Y | Ando, Hiroshi; Hasegawa, Katsuya; Hatano, Takahisa; Kinugawa, Hiroki; Miyake, Jiro; Ninomiya, Kazuki; Nishiyama, Tamotsu; Sasada, Masahiko |

FIG. 30

| KEYWORD STORAGE UNIT 403 | |
|---|---|
| AAC | magneto optical disk |
| AC3 | MD |
| ATRAC | MD player |
| blocking effect | mini disk |
| broadcasting satellite receiver | modulation |
| CD | modulator |
| CD player | motion compensation |
| CD ROM | motion vector |
| CG | MUSE |
| chromakey | OFDM |
| color temperature | optical disk |
| compact disk | optical magnetic disk |
| composite color television signal | orthogonal transform |
| composite signal | PCM audio |
| composite television signal | photo sensor |
| compressing code | polygon |
| computer graphics | QAM |
| conditional access | QPSK |
| DAD player | quantization |
| demodulation | Reed Solomon |
| demodulator | run length limited code |
| deshuffling | satellite broadcasting receiver |
| digital audio disk | satellite communication |
| digital camcorder | satellite telecasting system |
| digital camera | sharpness |
| digital still camera | shuffling |
| digital TV | still video camera |
| digital VCR | TBC |
| digital video camera | television |
| digital VTR | television camera |
| disk reproducing device | texture area |
| DVB | texture mapping |
| DVC | texture pattern |
| DVD player | time axis compensation |
| DVD recorder | time axis correction |
| edge detection | time base corrector |
| EDTV | transcoder |
| electronic camera | transport packet |
| electronic program guide | transport stream |
| electronic still camera | Trellis |
| electronic TV program guide | variable length coding |
| EPG | video camera |
| error correcting check bit | video disc |
| error correcting syndrome; | video disk |
| fade in | video disc player |
| fade out | video disk player |
| flicker | video disc reproducing system |
| high efficiency coding | video disk reproducing system |
| high efficiency encoding | video printer |
| image pickup | Viterbi |
| image sensing | VSB |
| image sensor | Y/C separating |
| ink jet printer | Y/C separation |

FIG. 31A

| KEYWORD | TOTAL | T1 | T2 | T3 | T4 | T5 | T6 | T7 | Y | NOT APPLICABLE |
|---|---|---|---|---|---|---|---|---|---|---|
| CD ROM | 62 | 0 | 0 | 0 | 0 | 0 | 0 | 61 | 1 | 0 |
| CD player | 2 | 0 | 0 | 0 | 0 | 0 | 0 | 2 | 0 | 0 |
| CG | 5 | 0 | 0 | 3 | 0 | 0 | 0 | 0 | 0 | 2 |
| DVC | 12 | 0 | 0 | 0 | 0 | 0 | 12 | 0 | 0 | 0 |
| DVD player | 26 | 0 | 0 | 26 | 0 | 0 | 0 | 0 | 0 | 0 |
| EDTV | 35 | 28 | 0 | 0 | 0 | 0 | 0 | 0 | 7 | 0 |
| MUSE | 63 | 0 | 0 | 0 | 0 | 0 | 0 | 0 | 63 | 0 |
| OFDM | 260 | 260 | 0 | 0 | 0 | 0 | 0 | 0 | 0 | 0 |
| QAM | 641 | 641 | 0 | 0 | 0 | 0 | 0 | 0 | 0 | 0 |
| QPSK | 73 | 73 | 0 | 0 | 0 | 0 | 0 | 0 | 0 | 0 |
| Reed Solomon | 8 | 8 | 0 | 0 | 0 | 0 | 0 | 0 | 0 | 0 |
| Trellis | 70 | 70 | 0 | 0 | 0 | 0 | 0 | 0 | 0 | 0 |
| VSB | 148 | 148 | 0 | 0 | 0 | 0 | 0 | 0 | 0 | 0 |
| color temperature | 35 | 0 | 0 | 0 | 0 | 17 | 0 | 0 | 18 | 0 |
| compact disk | 7 | 0 | 0 | 0 | 0 | 0 | 0 | 7 | 0 | 0 |
| composite color television signal | 23 | 0 | 0 | 0 | 0 | 0 | 0 | 0 | 23 | 0 |
| composite signal | 17 | 0 | 0 | 0 | 0 | 1 | 0 | 0 | 16 | 0 |
| composiste television signal | 2 | 0 | 0 | 0 | 0 | 0 | 2 | 0 | 0 | 0 |
| computer graphics | 12 | 0 | 0 | 7 | 0 | 0 | 0 | 0 | 0 | 5 |
| demodulation | 229 | 219 | 0 | 4 | 0 | 2 | 4 | 0 | 0 | 0 |
| demodulator | 114 | 103 | 0 | 0 | 0 | 0 | 11 | 0 | 0 | 0 |
| deshuffling | 27 | 0 | 0 | 0 | 0 | 0 | 27 | 0 | 0 | 0 |
| digital TV | 121 | 120 | 0 | 0 | 0 | 0 | 0 | 0 | 1 | 0 |
| digital VCR | 19 | 3 | 0 | 0 | 0 | 0 | 16 | 0 | 0 | 0 |
| digital VTR | 53 | 0 | 0 | 0 | 0 | 0 | 53 | 0 | 0 | 0 |
| electronic camera | 5 | 0 | 0 | 0 | 0 | 5 | 0 | 0 | 0 | 0 |

FIG. 31B

| KEYWORD | TOTAL | T1 | T2 | T3 | T4 | T5 | T6 | T7 | Y | NOT APPLICABLE |
|---|---|---|---|---|---|---|---|---|---|---|
| electronic still camera | 1 | 0 | 0 | 0 | 0 | 1 | 0 | 0 | 0 | 0 |
| high efficiency coding | 20 | 0 | 0 | 0 | 3 | 0 | 17 | 0 | 0 | 0 |
| high efficiency encoding | 50 | 0 | 0 | 0 | 0 | 0 | 50 | 0 | 0 | 0 |
| image pickup | 110 | 0 | 0 | 0 | 0 | 110 | 0 | 0 | 0 | 0 |
| magneto optical disk | 1 | 0 | 0 | 0 | 0 | 0 | 1 | 0 | 0 | 0 |
| modulation | 394 | 378 | 0 | 4 | 0 | 2 | 10 | 0 | 0 | 0 |
| modulator | 258 | 241 | 0 | 0 | 0 | 0 | 17 | 0 | 0 | 0 |
| motion compensation | 117 | 3 | 0 | 0 | 114 | 0 | 0 | 0 | 0 | 0 |
| motion vector | 413 | 0 | 0 | 0 | 413 | 0 | 0 | 0 | 0 | 0 |
| optical disk | 40 | 0 | 0 | 36 | 0 | 0 | 3 | 1 | 0 | 0 |
| orthogonal transform | 4 | 0 | 0 | 0 | 4 | 0 | 0 | 0 | 0 | 0 |
| polygon | 291 | 0 | 0 | 0 | 0 | 0 | 0 | 0 | 0 | 291 |
| quantization | 275 | 0 | 0 | 0 | 268 | 0 | 2 | 0 | 0 | 5 |
| satellite communication | 3 | 3 | 0 | 0 | 0 | 0 | 0 | 0 | 0 | 0 |
| sharpness | 1 | 0 | 0 | 0 | 0 | 1 | 0 | 0 | 0 | 0 |
| shuffling | 68 | 0 | 0 | 0 | 1 | 0 | 67 | 0 | 0 | 0 |
| television | 119 | 10 | 7 | 27 | 1 | 9 | 26 | 4 | 35 | 0 |
| television camera | 8 | 0 | 0 | 0 | 0 | 8 | 0 | 0 | 0 | 0 |
| texture mapping | 36 | 0 | 0 | 0 | 0 | 0 | 0 | 0 | 0 | 36 |
| texture pattern | 1 | 0 | 0 | 0 | 0 | 0 | 0 | 0 | 0 | 1 |
| transport stream | 8 | 0 | 8 | 0 | 0 | 0 | 0 | 0 | 0 | 0 |
| variable length coding | 25 | 0 | 0 | 2 | 14 | 0 | 9 | 0 | 0 | 0 |
| video camera | 372 | 0 | 0 | 2 | 0 | 370 | 0 | 0 | 0 | 0 |
| video disc | 7 | 0 | 0 | 6 | 0 | 0 | 0 | 1 | 0 | 0 |
| video disk | 48 | 0 | 0 | 48 | 0 | 0 | 0 | 0 | 0 | 0 |
| video printer | 4 | 0 | 0 | 0 | 0 | 4 | 0 | 0 | 0 | 0 |

FIG. 32A

| KEYWORD | EVALUATION SECTION |
|---|---|
| CD ROM | T7 |
| CD player | T7 |
| CG | T3 |
| DVC | T6 |
| DVD player | T3 |
| EDTV | T1 |
| MUSE | Y |
| OFDM | T1 |
| QAM | T1 |
| QPSK | T1 |
| Reed Solomon | T1 |
| Trellis | T1 |
| VSB | T1 |
| color temperature | Y |
| compact disk | T7 |
| composite color television signal | Y |
| composite signal | Y |
| composiste television signal | T6 |
| computer graphics | T3 |
| demodulation | T1 |
| demodulator | T1 |
| deshuffling | T6 |
| digital TV | T1 |
| digital VCR | T6 |
| digital VTR | T6 |
| electronic camera | T5 |

FIG. 32B

| KEYWORD | EVALUATION SECTION |
|---|---|
| electronic still camera | T5 |
| high efficiency coding | T6 |
| high efficiency encoding | T6 |
| image pickup | T5 |
| magneto optical disk | T6 |
| modulation | T1 |
| modulator | T1 |
| motion compensation | T4 |
| motion vector | T4 |
| optical disk | T3 |
| orthogonal transform | T4 |
| polygon | NOT APPLICABLE |
| quantization | T4 |
| satellite communication | T1 |
| sharpness | T5 |
| shuffling | T6 |
| television | Y |
| television camera | T5 |
| texture mapping | NOT APPLICABLE |
| texture pattern | NOT APPLICABLE |
| transport stream | T2 |
| variable length coding | T4 |
| video camera | T5 |
| video disc | T3 |
| video disk | T3 |
| video printer | T5 |

FIG. 33

| EVALUATION SECTION | KEYWORD |
|---|---|
| T1 | EDTV, OFDM, QAM, QPSK, Reed Solomon, Trellis, VSB, demodulation, demodulator, digital TV, modulation, modulator, satellite communication |
| T2 | transport stream |
| T3 | CG, DVD player, computer graphics, optical disk, video disc, video disk |
| T4 | motion compensation, motion vector, orthogonal transform, quantization, variable length coding |
| T5 | electronic camera, electronic still camera, image pickup, sharpness, television camera, video camera, video printer |
| T6 | DVC, composite television signal, deshuffling, digital VCR, digital VTR, high efficiency coding, high efficiency encoding, magneto optical disk, shuffling |
| T7 | CD player, CD ROM, compact disk |
| Y | MUSE, color temperature, composite color television signal, composite signal, television |
| NOT APPLICABLE | polygon, texture mapping, texture pattern |

FIG. 35

| PATENT CLASSIFICATION CODE | EVALUATION SECTION |
|---|---|
| 345 | T2, T7 |
| 348 | T1, T2, T4, T5, T6, Y |
| 358 | T5, T6 |
| 360 | T6, T7 |
| 369 | T3, T4 |
| 375 | T1 |
| 386 | T3, T4, T5, T6, T7, Y |
| 396 | T5 |

FIG. 36

| EVALUATION SECTION | PATENT CLASSIFICATION CODE |
|---|---|
| T1 | 348, 375 |
| T2 | 345, 348 |
| T3 | 369, 386 |
| T4 | 348, 369, 386 |
| T5 | 348, 358, 386, 396 |
| T6 | 348, 358, 360, 386 |
| T7 | 345, 360, 386 |
| Y | 348, 386 |

FIG. 37

| PATENT FILE | T1 | T2 | T3 | T4 | T5 | T6 | T7 | Y |
|---|---|---|---|---|---|---|---|---|
| 05526045.TXT | 1 | 1 | 0 | 1 | 1 | 1 | 0 | 1 |
| 05581362.TXT | 1 | 1 | 1 | 1 | 1 | 1 | 1 | 1 |
| 05594550.TXT | 1 | 1 | 1 | 1 | 1 | 1 | 1 | 1 |
| 05655051.TXT | 0 | 0 | 1 | 1 | 1 | 1 | 1 | 1 |
| 05657098.TXT | 1 | 1 | 0 | 1 | 1 | 1 | 0 | 1 |
| 05691819.TXT | 0 | 0 | 0 | 0 | 1 | 1 | 1 | 0 |
| 05699125.TXT | 1 | 1 | 0 | 1 | 1 | 1 | 0 | 1 |
| 05739853.TXT | 1 | 1 | 0 | 1 | 1 | 1 | 0 | 1 |
| 05742341.TXT | 1 | 1 | 0 | 1 | 1 | 1 | 0 | 1 |
| 05751375.TXT | 1 | 1 | 0 | 1 | 1 | 1 | 0 | 1 |
| 05767845.TXT | 0 | 1 | 0 | 0 | 0 | 0 | 1 | 0 |
| 05784107.TXT | 1 | 1 | 0 | 1 | 1 | 1 | 0 | 1 |
| 05802241.TXT | 1 | 1 | 1 | 1 | 1 | 1 | 1 | 1 |
| 05818435.TXT | 0 | 1 | 0 | 0 | 0 | 0 | 1 | 0 |
| 05825421.TXT | 1 | 1 | 0 | 1 | 1 | 1 | 0 | 1 |
| 05852446.TXT | 0 | 1 | 0 | 0 | 0 | 0 | 1 | 0 |
| 05884004.TXT | 0 | 0 | 1 | 1 | 1 | 1 | 1 | 1 |
| 05892879.TXT | 1 | 1 | 1 | 1 | 1 | 1 | 1 | 1 |
| 05907659.TXT | 0 | 0 | 1 | 1 | 1 | 1 | 1 | 1 |
| 05909255.TXT | 1 | 1 | 0 | 1 | 1 | 1 | 0 | 1 |
| 05973681.TXT | 1 | 1 | 0 | 1 | 1 | 1 | 1 | 1 |
| 05978032.TXT | 1 | 1 | 0 | 1 | 1 | 1 | 0 | 1 |
| 05999696.TXT | 0 | 0 | 1 | 1 | 1 | 1 | 1 | 1 |
| 06040864.TXT | 1 | 1 | 0 | 1 | 1 | 1 | 0 | 1 |
| 06044198.TXT | 1 | 1 | 1 | 1 | 1 | 1 | 1 | 1 |
| 06049651.TXT | 1 | 1 | 1 | 1 | 1 | 1 | 1 | 1 |
| 06069667.TXT | 1 | 1 | 0 | 1 | 1 | 1 | 0 | 1 |
| 06088507.TXT | 0 | 0 | 1 | 1 | 1 | 1 | 1 | 1 |
| 06094455.TXT | 1 | 1 | 0 | 1 | 1 | 1 | 0 | 1 |
| 06148136.TXT | 1 | 1 | 1 | 1 | 1 | 1 | 1 | 1 |

TEXT CLASSIFICATION APPARATUS

BACKGROUND OF THE INVENTION

The present invention relates to a classification system for texts, and in particular to a system which, in the evaluation of texts such as patent documents, automatically assigns texts one by one to the most fitting evaluation section from a plurality of evaluation sections.

Conventionally, databases of technical texts were searched within the scope high-speed retrieval is performed with a previously registered retrieval condition, and information matching with conditions requested by a user is quickly distributed to designated sections. In this system, retrieval is performed according to the retrieval conditions created by the expert evaluating the technical texts, so that there is no guarantee that all the texts that should be inspected by the company are in fact retrieved.

However, as the number of disputes regarding intellectual property rights grows and the damages awarded for infringement of intellectual property rights increase, we are entering an age, in which the company management needs to assign the evaluation of a broad scope of technology related to products dealt with by the company to research and development sections, to confirm the safety of the intellectual property rights for the products of the company, or in other words, that the intellectual property rights of third parties are not infringed.

SUMMARY OF THE INVENTION

It is an object of the present invention to provide a system for classifying texts by category, and more particularly to provide a system for automatically assigning as an evaluation section the most fitting section from among a plurality of research and development sections, one by one for a large number of technical texts.

In order to attain this object in accordance with the present invention, three correspondence tables between keywords and evaluation sections, namely a priority, a regular and an auxiliary correspondence table, are established, the text data of documents are analyzed, and the occurrence count of the keywords included in the correspondence table is counted. When there is a keyword included in the priority correspondence table whose occurrence count is not zero, then the section corresponding to the keyword with the maximum occurrence count is determined as the evaluation section. When the occurrence count of all keywords included in the priority correspondence table is zero but there is a keyword included in the regular correspondence table whose occurrence count is not zero, then the evaluation section corresponding to the keyword with the maximum occurrence count is determined as the evaluation section. When the occurrence count of all keywords included in the priority correspondence table and the regular correspondence table is zero but there is a keyword included in the auxiliary correspondence table whose occurrence count is not zero, then the evaluation section corresponding to the keyword with the maximum occurrence count is determined as the evaluation section. And when the occurrence count of all keywords included in the three (priority, regular and auxiliary) correspondence tables is zero, then the evaluation section is taken to be undecided.

In accordance with the present invention, in a system classifying texts by category, in particular texts of large volumes can be suitably assigned automatically to evaluation sections, thus serving as a powerful tool for corporate operative strategy.

BRIEF DESCRIPTION OF THE DRAWINGS

FIG. 3 lists the numbers of the 30 U.S. patent documents serving as an example of the evaluation object in the text evaluation section assignment in accordance with the present invention.

FIG. 4 lists an example of the research and development areas of the various development teams in FIG. 2.

FIGS. 6A, 6B and 6C illustrate an example of a table (regular correspondence table) stored in the keyword/evaluation section correspondence table storage unit in FIG. 5.

FIG. 7 shows a reverse index table corresponding to FIGS. 6A to 6C.

FIG. 8 shows an example of a priority correspondence table that is further stored in the keyword/evaluation section correspondence table storage unit in FIG. 5.

FIG. 9 shows an example of an auxiliary correspondence table that is further stored in the keyword/evaluation section correspondence table storage unit in FIG. 5.

FIG. 10 illustrates an example of the output to the display device in FIG. 5.

FIG. 11 shows an example of the overall result given out to the evaluation section determination result storage unit in FIG. 5.

FIG. 12 shows an example of the determination result for a certain case that is given out to the evaluation section determination result storage unit in FIG. 5.

FIGS. 13A and 13B show an example of the result of the word analysis, which is an option for the first embodiment.

FIG. 14 shows an example of the determination result for another case that is given out to the evaluation section determination result storage unit in FIG. 5.

FIG. 15 shows an example of the determination result for yet another case that is given out to the evaluation section determination result storage unit in FIG. 5.

FIG. 16 shows an example of using the weightings for each keyword in FIGS. 6A to 6C, FIG. 8 and FIG. 9 in the system in FIG. 5.

FIG. 18 shows the input into the patent classification code/evaluation section correspondence table creation unit of FIG. 17, and shows the results of the determined evaluation sections as well as the extracted patent classification codes for each patent document.

FIGS. 19A, 19B, 19C and 19D show the correspondence between the patent classification codes and evaluation sections in FIG. 18.

FIGS. 20A, 20B and 20C show an example of a patent classification code evaluation section correspondence table created based on the correspondence of FIGS. 19A to 19D.

FIG. 21 shows a reverse index table corresponding to FIGS. 20A to 20C.

FIG. 23 shows an example of the output to the display device in FIG. 22.

FIG. 24 shows an example of the determination result for a certain case that is given out to the evaluation section determination result storage unit in FIG. 22.

FIG. 25 illustrates a comparison of the processing times of the first embodiment and the third embodiment for the 30 U.S. patent documents in FIG. 3.

FIG. 26 illustrates the case that the content of FIG. 25 is expanded to the processing of 10,000 U.S. patent documents.

FIGS. 28A and 28B show an example of a table stored in the name/evaluation section correspondence table storage unit in FIG. 27.

FIG. 29 illustrates a reverse index table corresponding to FIGS. 28A and 28B.

FIG. 30 shows an example of the keywords stored in the keyword storage unit in FIG. 27.

FIGS. 31A and 31B show an example of the determined sums of the keyword occurrence count in the patent documents corresponding to the various evaluation sections, in preparation for establishing a correspondence between keywords and evaluation sections with the system of FIG. 27.

FIGS. 32A and 32B show an example of a keyword/ evaluation section correspondence table created with the system of FIG. 27.

FIG. 33 shows a reverse index table corresponding to FIGS. 32A and 32B.

FIG. 35 shows an example of a table stored in the patent classification code/evaluation section correspondence table storage unit in FIG. 34.

FIG. 36 shows a reverse index table corresponding to FIG. 35.

FIG. 37 shows an example of which the evaluation sections are whose corresponding keywords are used by the keyword extraction/counting unit in FIG. 34 for each of the patent documents.

DETAILED DESCRIPTION OF THE INVENTION

Figure 1:
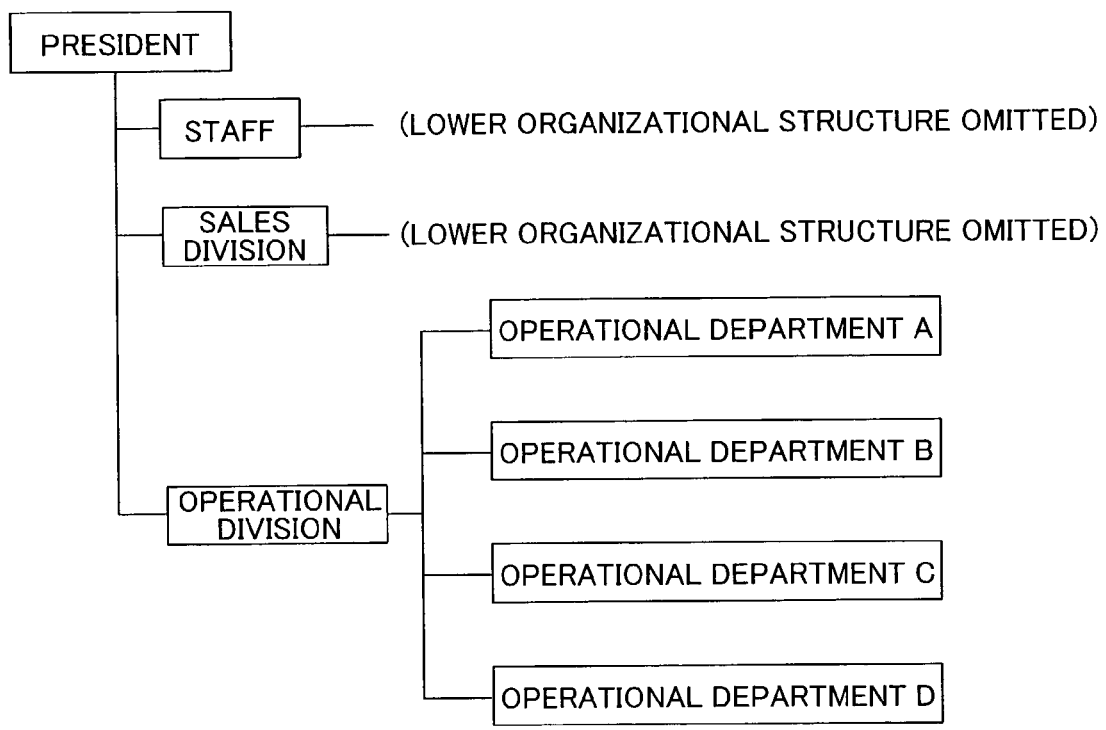
FIG. 1 is an organization chart of a model company serving as an example of an object for application of the text evaluation section assignment system in accordance with the present invention.
Figure 2:
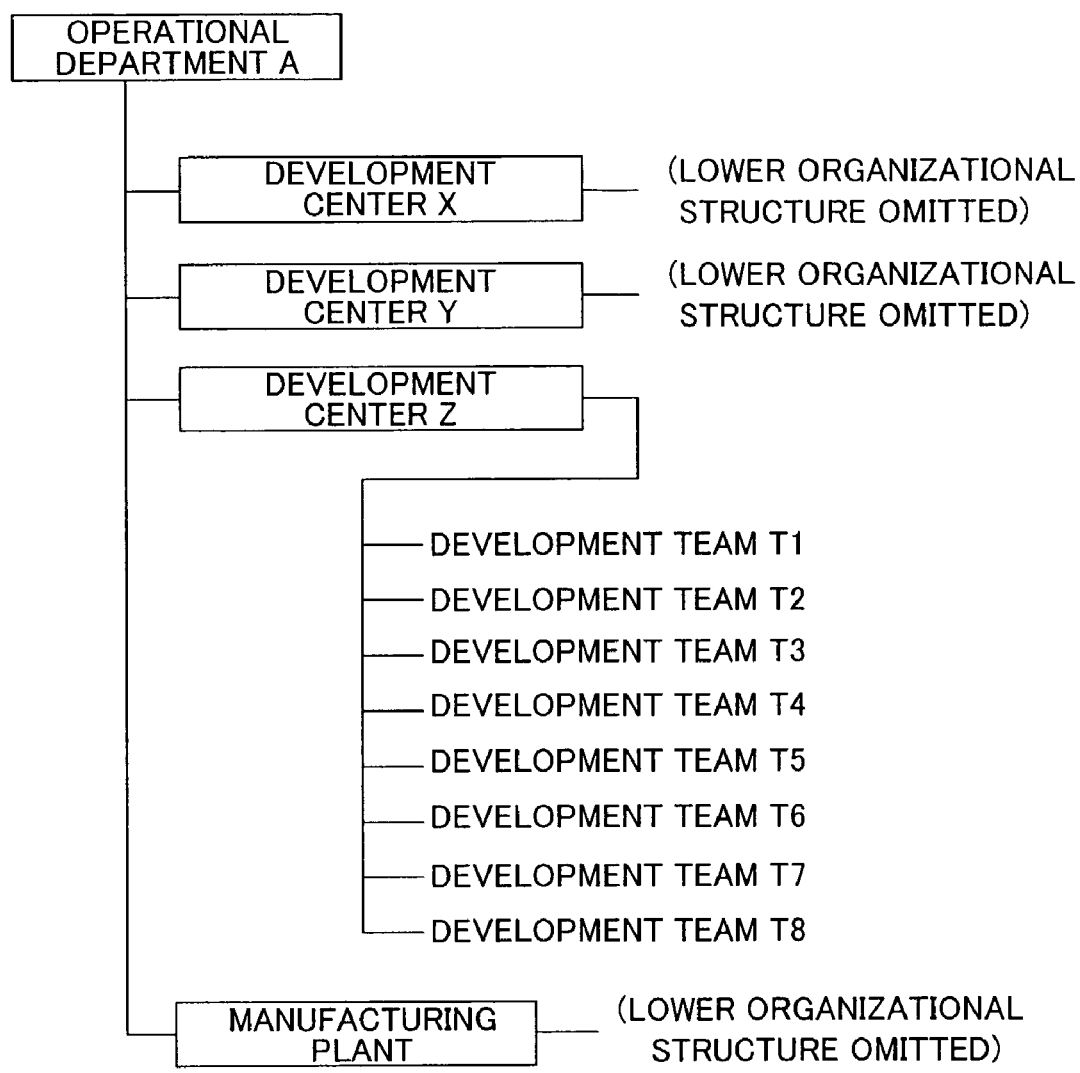
FIG. 2 is a more detailed organization chart of department A in FIG. 1.

Referring to the accompanying drawings, the following is an explanation of a text classification system in accordance with the present invention, and in particular an example in which a text evaluation section assignment system of the present invention is applied to a model company. FIG. 1 shows an organization chart of a model company, and FIG. 2 shows an organization chart of an operational department A within FIG. 1. Here, it is explained how the evaluation of the 30 U.S. patents shown in FIG. 3 is assigned to the development teams T1 to T8 belonging to the development center Z shown in FIG. 2, which is part of the operational department A in FIG. 1. As shown in FIG. 4, the development teams T1 to T8 of the development center Z work on the research and development of system LSIs used for various kinds of digital AV products.

First Embodiment

First, an example of a text evaluation section assignment system using a correspondence table of keywords and evaluation sections is explained.

Figure 5:
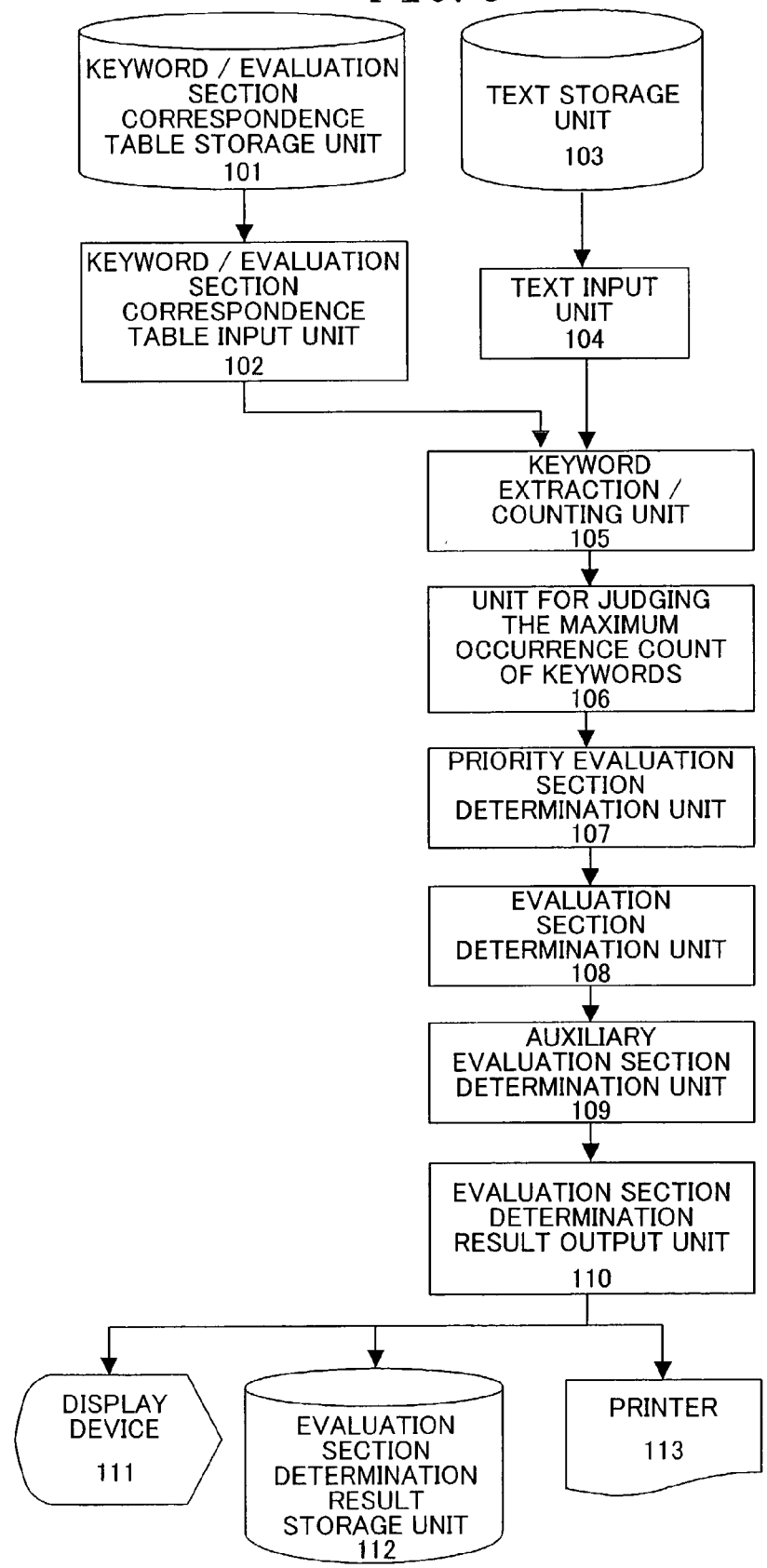
FIG. 5 is a block diagram of the configuration of a text evaluation section assignment system in accordance with a first embodiment of the present invention.

FIG. 5 is a block diagram showing the configuration of a first embodiment of the present invention. In FIG. 5, numeral 101 denotes a table storage unit storing a correspondence table of keywords and evaluation sections, numeral 102 denotes a keyword/evaluation section correspondence table input unit, numeral 103 denotes a text storage unit storing a plurality of patent texts, numeral 104 denotes a text input unit, numeral 105 denotes a keyword extraction/counting unit that extracts keywords from the patent documents and counts the occurrence count of each keyword, numeral 106 denotes a unit for judging the maximum occurrence count of keywords, numeral 107 denotes a priority evaluation section determination unit, numeral 108 denotes an evaluation section determination unit, numeral 109 denotes an auxiliary evaluation section determination unit, numeral 110 denotes an evaluation section determination result output unit, numeral 111 denotes a display device, numeral 112 denotes an evaluation section determination result storage unit, and numeral 113 denotes a printer.

The text data of the 30 U.S. patents shown in FIG. 3 are stored in the text storage unit 103. Furthermore, the correspondence table of keywords and evaluation sections shown in FIGS. 6A to 6C is stored in the keyword/ evaluation section correspondence table storage unit 101. "T1" to "T8" refer to the development teams belonging to the development center Z, and "Y" refers to the development center Y shown in FIG. 2. It is assumed that the development center Y handles the research and development of system LSIs for analog audio/video products. "not applicable" means that the company does not develop or produce that product. It should be noted that in FIGS. 6A to 6C, the keywords are in a one-to-one correspondence with the evaluation sections, but if for example the keyword "video disk" is in a one-to-two correspondence with the development teams T3 and T4, then the field for the evaluation section corresponding to "video disk" should carry "T3, T4". FIG. 7 shows by reverse indexing of FIGS. 6A to 6C which keywords correspond to the various evaluation sections.

Moreover, in the text evaluation section assignment system of this embodiment, the correspondence table of FIGS. 6A to 6C (also referred to as "regular correspondence table" in the following) is stored in the keyword/evaluation section correspondence table storage unit 101 together with the priority table shown in FIG. 8 and the auxiliary correspondence table shown in FIG. 9. It should be noted that the regular correspondence table in FIGS. 6A to 6C, the priority correspondence table in FIG. 8, and the auxiliary correspondence table in FIG. 9 are stored after adding a weighting to each keyword.

First, the keyword/evaluation section correspondence table input unit 102 reads out the tables shown in FIGS. 6A to 6C, FIG. 8 and FIG. 9. Next, the 30 U.S. patent documents shown in FIG. 3 are processed one by one. The text input unit 104 reads out the patent document text data one by one, and the keyword extraction/counting unit 105 extracts the keywords in the table shown in FIGS. 6A to 6C and FIG. 9 from the entire patent text and extracts the keywords in the table shown in FIG. 8 from the abstract and the claims. The occurrence count of the extracted keywords is counted. The unit 106 for judging the maximum occurrence count of keywords judges for each of the three correspondence tables, namely the priority, the regular and the auxiliary correspondence table, the keyword with the maximum occurrence count. Thus, when the occurrence count of the keywords in the priority table shown in FIG. 8 is not zero, the priority evaluation section determination unit 107 determines the evaluation section corresponding to the keyword with the highest occurrence count as the most fitting evaluation section, based on the judgment result of the unit 106 for judging the maximum occurrence count of keywords. When there are a plurality of most frequent keywords, then it doesn't matter whether the evaluation section is selected from the keyword found first or whether a number of evaluation sections equal to the number of the most frequent keywords is selected, because in either case an evaluation section can be assigned.

If the evaluation section has not been decided by the priority evaluation section determination unit 107, then, when the occurrence count of the keywords in the regular correspondence table shown in FIGS. 6A to 6C is not zero, the evaluation section determination unit 108 determines the evaluation section corresponding to the keyword with the highest occurrence count as the most fitting evaluation section.

If the evaluation section has also not been decided by the evaluation section determination unit 108, then, when the occurrence count of the keywords in the auxiliary correspondence table shown in FIG. 9 is not zero, the auxiliary evaluation section determination unit 109 determines the evaluation section corresponding to the keyword with the highest occurrence count as the most fitting evaluation section. The keywords listed in the auxiliary correspondence table in FIG. 9 are keywords that have a lower priority degree than the keywords listed in the regular correspondence table in FIGS. 6A to 6C, but play the role of ensuring that the evaluation section does not stay undecided.

The evaluation section determination result output unit 110 outputs the overall result of the determination with the priority evaluation section determination unit 107, the evaluation section determination unit 108 and the auxiliary evaluation section determination unit 109 to the display device 111 and the evaluation section determination result storage unit 112, after which, if necessary, it outputs the determination results stored in the evaluation section determination result storage unit 112 to the printer 113.

FIG. 10 shows an example of the output to the display device 111. In FIG. 10, after the text evaluation section assignment system is launched, first the start time is given out, and then the file names of the 30 patent specifications and the selected evaluation sections are given out. The format with which the file names are displayed is with a "0" preceding the number of the U.S. patent, and with the file extension ".TXT" attached to the file name. "stage 1" means that the evaluation section has been determined by the priority evaluation section determination unit 107, "stage 2" means that the evaluation section has been determined by the evaluation section determination unit 108, and "stage 3" means that the evaluation section has been determined by the auxiliary evaluation section determination unit 109. The end of each row indicates the evaluation section, and at the end, the termination time of the text evaluation section assignment system is given out. It should be noted that although not indicated in FIG. 10, if an evaluation section has not been determined by neither the priority evaluation section determination unit 107, nor the evaluation section determination unit 108 nor the auxiliary evaluation section determination unit 109, then the evaluation section is displayed as "undecided."

The overall results for all cases listed in FIG. 11 are given out to the evaluation section determination result storage unit 112, and then the results for the patent documents that have been temporarily stored are given out. The output to the evaluation section determination result storage unit 112 is formatted in HTML, and in the present embodiment, it is displayed with a browser. The right-pointed arrow without the vertical line at the upper left in FIG. 11 is a link button to the first determination result, and the right-pointed arrow with the vertical line is a link button to the last output item. The patents listed under "patent file" have links to the corresponding individual results.

As for the individual results, the three cases of determination with the priority evaluation section determination unit 107, determination with the evaluation section determination unit 108, and determination with the auxiliary evaluation section determination unit 109 are illustrated below. FIG. 12 shows the results for U.S. Pat. No. 6,148,136. The left-pointed arrow with the vertical line at the upper left in FIG. 12 is a link button to the overall results at the beginning, the left-pointed arrow without the vertical line is a link button to the previous result, the right-pointed arrow without the vertical line is a link button to the next result, and the right-pointed arrow with the vertical line is a link button to the end of the output. For the thirtieth result at the end, the right-pointed arrow without the vertical line has the same effect as the link button to the end of the output. After the link buttons, a serial number, the patent document file name, the title, the registration date, and the abstract are given out. In the abstract of U.S. Pat. No. 6,148,136, the term "digital VCR" included in the priority correspondence table in FIG. 8 appears once, so that the development team T6 is selected as the evaluation section. Below, the keywords used for the determination with the evaluation section determination unit 108 and the auxiliary evaluation section determination unit 109 as well as their occurrence count are given out together with the evaluation section. If there are none of the keywords included in FIGS. 6A to 6C, FIG. 8 and FIG. 9, then "no keywords corresponding to sections" is displayed in the keyword field, such as for "recommended evaluation section by auxiliary assignment" in the thirtieth result.

Moreover, it is possible to optionally select whether the words are analyzed and given out in order of occurrence count, and if this option is selected, then FIG. 13A and FIG. 13B are given out for U.S. Pat. No. 6,148,136. The results of FIG. 13A and FIG. 13B may be referenced when discussing whether the keywords listed in the correspondence tables of FIGS. 6A to 6C, FIG. 8 and FIG. 9 are insufficient.

Next, FIG. 14 shows an example of a case determined by the evaluation section determination unit 108. Omitting the explanations for items that are the same as in FIG. 12, an evaluation section for U.S. Pat. No. 5,699,125 cannot be determined by the priority evaluation section determination unit 107, so that "recommended evaluation section by priority assignment" lists the recommended section as "undecided." The evaluation section determination unit 108 finds "electronic TV program guide" and "EPG" among the keywords listed in the regular correspondence table of FIGS. 6A to 6C, and determines the development team T2 corresponding to with "electronic TV program guide", which has the maximum occurrence count, as the evaluation section. Below that, the keywords used for the determination with the auxiliary evaluation section determination unit 109 as well as their occurrence count are given out together with the evaluation section. The result of the words and occurrence count for U.S. Pat. No. 5,699,125 is different than in FIGS. 13A and 13B, although the format is the same, so that it has been omitted.

FIG. 15 shows an example of a case determined by the auxiliary evaluation section determination unit 109. Omitting the explanations for items that are the same as in FIG. 12, an evaluation section for U.S. Pat. No. 5,657,098 cannot be determined by the priority evaluation section determination unit 107 and the evaluation section determination unit 108, so that "recommended evaluation section by priority assignment" and "recommended evaluation section by regular assignment" list the recommended section as "undecided." The auxiliary evaluation section determination unit 109 finds "color temperature" and "television" among the keywords listed in the auxiliary correspondence table of FIG. 9, and determines the development center Y corresponding to "color temperature", which has the maximum occurrence count, as the evaluation section.

With this embodiment, three kinds correspondence tables of keywords and evaluation sections are set, namely a priority, a regular and an auxiliary correspondence table, and analyzing the text data of a document, the occurrence count of keywords included in the correspondence tables is counted. If the occurrence count of a keyword included in the priority correspondence table is not zero, then the section corresponding to the keyword with the highest occurrence count is determined as the evaluation section. If the occurrence count of all keywords included in the priority correspondence table is zero, but the occurrence count of a keyword included in the regular correspondence table is not zero, then the section corresponding to the keyword with the highest occurrence count is determined as the evaluation section. If the occurrence count of all keywords included in the priority correspondence table and the regular correspondence table is zero, but the occurrence count of a keyword included in the auxiliary correspondence table is not zero, then the section corresponding to the keyword with the highest occurrence count is determined as the evaluation section. If the occurrence count of all keywords included in all three (priority, the regular and the auxiliary) correspondence tables, is zero, then the evaluation section stays undecided, so that the evaluation section can be determined just by a simple search. As for the extraction and counting of keywords, the keywords in the priority correspondence table are extracted only from the abstract and the claims, whereas the keywords in the regular correspondence table and the auxiliary correspondence table are extracted from the entire patent text, so that the most fitting evaluation section can be determined with a minimum of undecided assignments.

The following is an explanation of the use of weightings for each keyword listed in the tables in FIGS. 6A to 6C, FIG. 8 and FIG. 9. The keyword extraction/counting unit 105 multiplies the count of each extracted keyword with the corresponding weighting and passes the resulting values as the occurrence count of those keywords to the unit 106 for judging the maximum occurrence count of keywords. The unit 106 for judging the maximum occurrence count of keywords judges the keyword having the maximum weighted occurrence count for the priority, the regular and the auxiliary correspondence tables, and the judgment result is passed on to the priority evaluation section determination unit 107, the evaluation section determination unit 108, and the auxiliary evaluation section determination unit 109. It should be noted that the weightings in the examples in FIGS. 6A to 6C, FIG. 8 and FIG. 9 have been set to the three values "1.0", "0.5" and "0.1", but the values of the weightings can be chosen as appropriate. Consequently, the weightings can be set as appropriate for each keyword, and flexible conditions for the selection of the evaluation section can be set in the correspondence tables of keywords and evaluation sections.

It should be noted that it is also possible that, after the unit 106 for judging the maximum occurrence count of keywords has determined the sum of the occurrence counts of keywords corresponding to each evaluation section, the maximum value of the sums of the occurrence count is judged, and the evaluation section determination unit 108 determines the section with the maximum value of the sum of occurrence counts as the evaluation section. For example, after the unit 106 for judging the maximum occurrence count of keywords has determined the sum of the weighted occurrence count of the keywords corresponding to each evaluation section for the three (priority, regular and auxiliary) correspondence tables, the evaluation section for which the sum of the occurrence count becomes maximal is determined as the most fitting evaluation section. FIG. 16 shows an example in which the unit 106 for judging the maximum occurrence count of keywords multiplies a weighting to the occurrence count of the keywords corresponding to the evaluation sections in preparation for judging the maximum, and then the sum (score) of the weighted occurrence counts for each evaluation section is shown for each of the patent documents. In the example of FIG. 16, the development team T5, which has the highest score, is selected as the evaluation section of U.S. Pat. No. 5,526,045, for example.

Moreover, in the preceding explanations, the evaluation section corresponding to the keywords with the highest occurrence count was determined as the most fitting evaluation section, but it is also possible to select a plurality of evaluation sections corresponding to keywords whose occurrence count is within a predetermined range.

Second Embodiment

Next, an example of a system is explained, which automatically creates a correspondence table of patent classification codes and evaluation sections.

Figure 17:
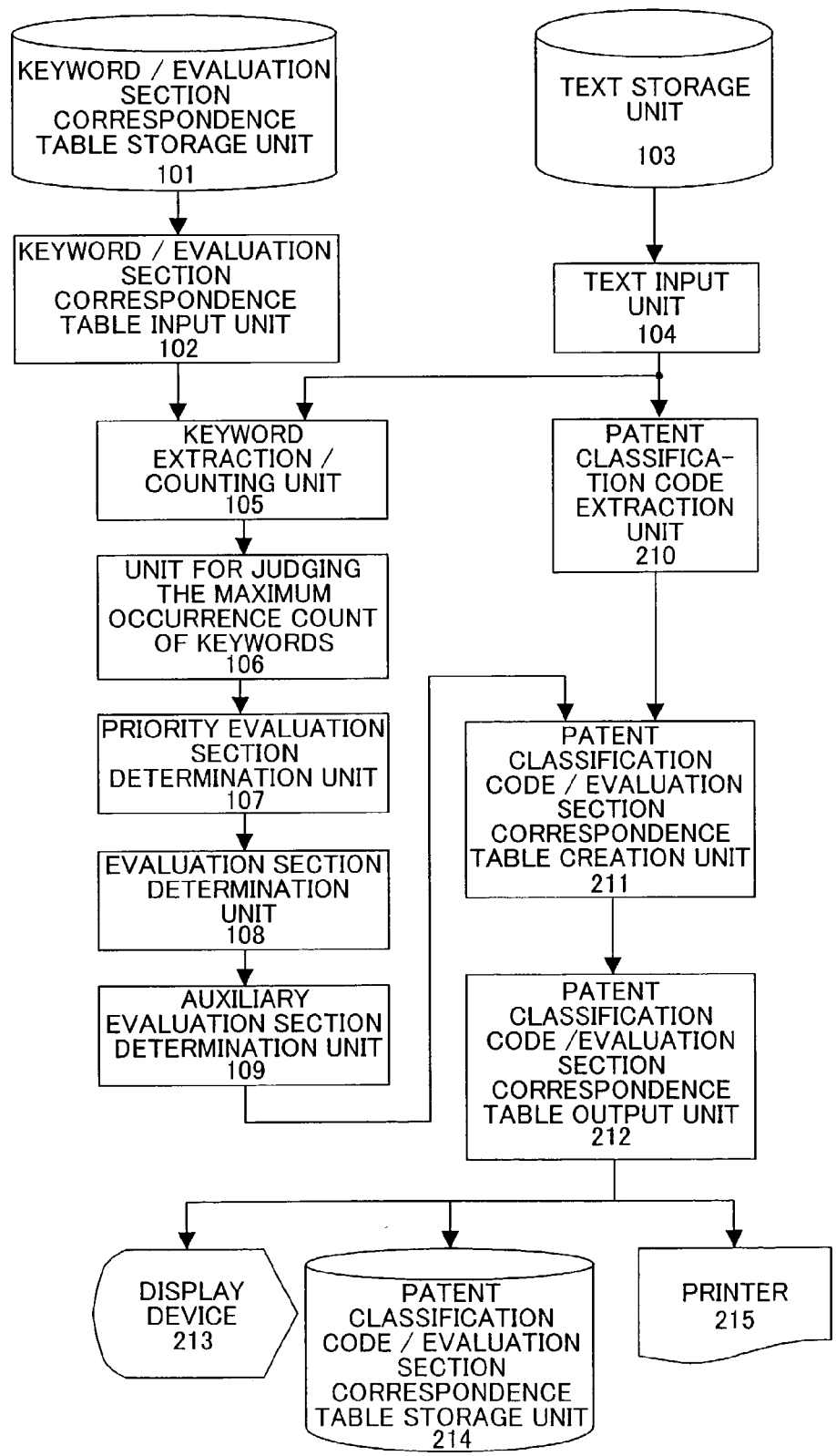
FIG. 17 is a block diagram of the configuration of a patent classification code/evaluation section correspondence table creation system in accordance with a second embodiment of the present invention.

FIG. 17 is a block diagram showing the configuration of the second embodiment of the present invention. In FIG. 17, numeral 101 denotes a table storage unit storing a correspondence table of keywords and evaluation sections, numeral 102 denotes a keyword/evaluation section correspondence table input unit, numeral 103 denotes a text storage unit storing a plurality of patent documents, numeral 104 denotes a text input unit, numeral 105 denotes a keyword extraction/counting unit extracting keywords from patent documents and counting the occurrence count of each keyword, numeral 106 denotes a unit for judging the maximum occurrence count of keywords, numeral 107 denotes a priority evaluation section determination unit, numeral 108 denotes an evaluation section determination unit, numeral 109 denotes an auxiliary evaluation section determination unit, numeral 210 denotes a patent classification code extraction unit, numeral 211 denotes a patent classification code/evaluation section correspondence table creation unit, numeral 212 denotes a patent classification code/evaluation section correspondence table output unit, numeral 213 denotes a display device, numeral 214 denotes a patent classification code/evaluation section correspondence table storage unit, and numeral 215 denotes a printer.

In FIG. 17, the operation up to determining the evaluation section is the same as in the first embodiment of FIG. 5, so that further explanations thereof have been omitted. Regarding the extraction of patent classification codes, the extraction can be performed by the patent classification code extraction unit 210 as the patent documents are entered one by one into the text input unit 104 in order to determine the evaluation section, or the extraction can be performed by the patent classification code extraction unit 210 by inputting the patent documents one by one with the text input unit 104 once again after all evaluation sections have been decided. Eventually, the evaluations sections and patent classification codes corresponding to the patent documents are obtained, as shown in FIG. 18.

With the patent classification code/evaluation section correspondence table creation unit 211, the table in FIG. 18 is converted into a table of evaluation sections corresponding to the patent classification codes, and the table shown in FIGS. 19A to 19D is obtained. When there is only one evaluation section corresponding to a patent classification code, then this section is determined to be the evaluation section corresponding to that patent classification code, and when there are a plurality of evaluation sections corresponding to a patent classification code, then the section with the highest hit number is determined to be the evaluation section. When there are a plurality of sections for which the hit number is highest, then this plurality of sections may be determined as the evaluation sections corresponding to that patent classification code, or the section found first may be determined as the evaluation section corresponding to that patent classification code. The present embodiment adopts the first approach. In FIGS. 19A to 19D, there is only one section for almost all patent classification codes, but for the patent classification code "358/906," there are the development teams T5 and T6 with one hit each, so that the two sections development team T5 and development team T6 are both determined as evaluation sections corresponding to that code "358/906." For the patent classification code "386/46," there are three hits for development team T1 and two hits for development team T6, so that development team T1 is determined as the evaluation section corresponding to that code "386/46." For the patent classification code "386/95," there are three hits for development team T3 and one hit for development team T5, so that development team T3 is determined as the evaluation section corresponding to that code "386/95." For the patent classification code "386/98," there are three hits for development team T3 and one hit for development team T6, so that development team T3 is determined as the evaluation section corresponding to that code "386/98." When the results are expressed as the evaluation sections corresponding to the patent classification codes, the table of FIGS. 20A to 20C, that is, the patent classification code/evaluation section correspondence table is obtained. Also, when the same results are expressed as the patent classification codes corresponding to the evaluation sections, then the table of FIG. 21 is obtained. The patent classification code/evaluation section correspondence table created by the patent classification code/evaluation section correspondence table creation unit 211 is given out by the patent classification code/evaluation section correspondence table output unit 212 in HTML format to the patent classification code/evaluation section correspondence table storage unit 213.

With this embodiment, patent classification code/evaluation section correspondence tables can be created automatically, based on a keyword/evaluation section correspondence table, and the results may be utilized for example in a text evaluation section assignment system according to the third embodiment, which is explained next.

Third Embodiment

Next, an example of a text evaluation section assignment system using a correspondence table of patent classification codes and evaluation sections is explained.

Figure 22:
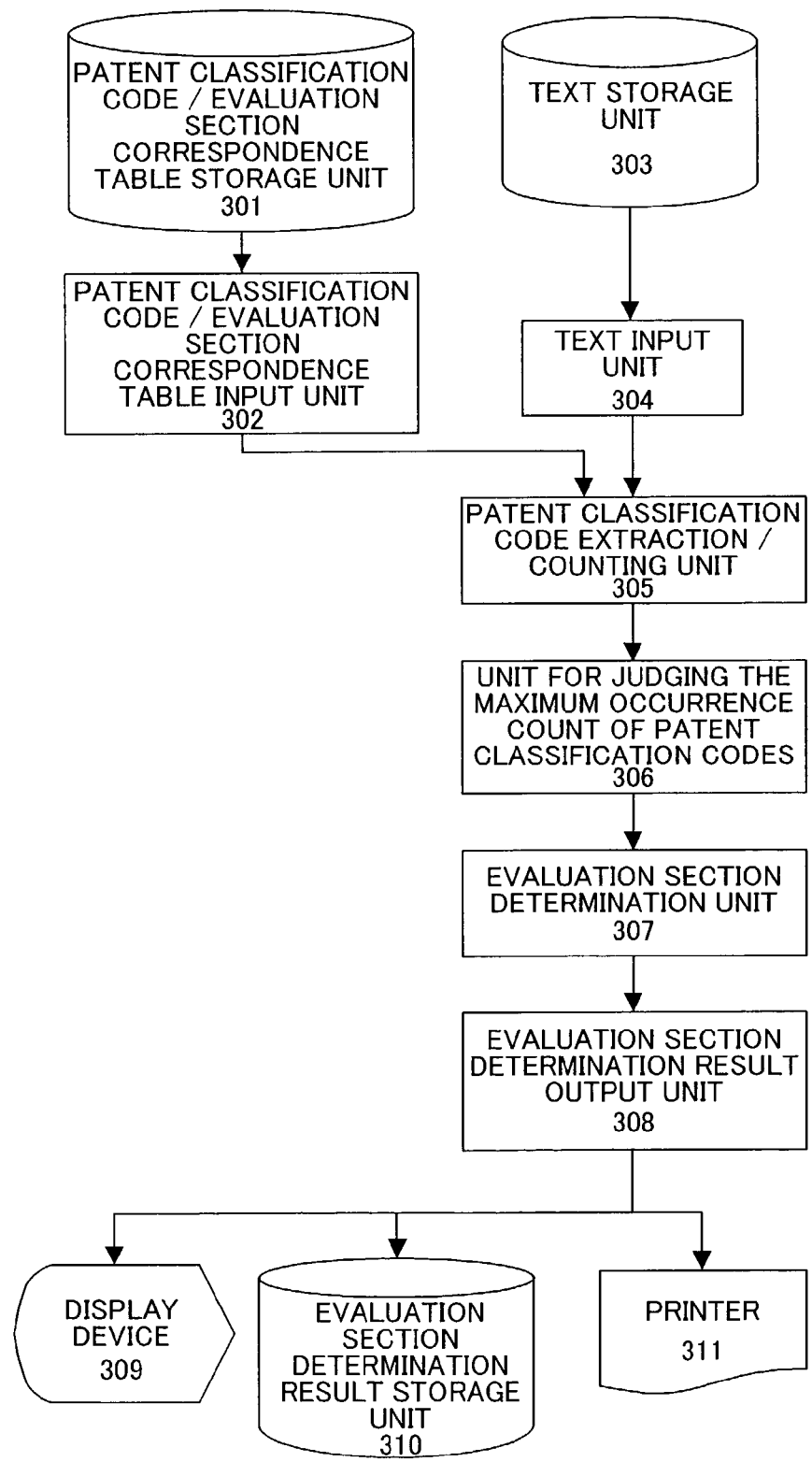
FIG. 22 is a block diagram of the configuration of a text evaluation section assignment system in accordance with a third embodiment of the present invention.

FIG. 22 is a block diagram showing the configuration of the third embodiment of the present invention. In FIG. 22, numeral 301 denotes a patent classification code/evaluation section correspondence table storage unit storing a correspondence table of patent classification codes and evaluation sections, numeral 302 denotes a patent classification code/evaluation section correspondence table input unit, numeral 303 denotes a text storage unit storing a plurality of patent documents, numeral 304 denotes a text input unit, numeral 305 denotes a patent classification code extraction/counting unit for extracting patent classification codes from patent documents and counting the occurrence count of each patent classification code, numeral 306 denotes a unit for judging the maximum occurrence count of patent classification codes, numeral 307 denotes an evaluation section determination unit, numeral 308 denotes an evaluation section determination result output unit, numeral 309 denotes a display device, numeral 310 denotes an evaluation section determination result storage unit, and numeral 311 denotes a printer.

The text data of the 30 U.S. patents shown in FIG. 3 are stored in the text storage unit 303. Furthermore, the correspondence table of patent classification codes and evaluation sections shown in FIGS. 20A to 20C is stored in the patent classification code/evaluation section correspondence table storage unit 301. In FIGS. 20A to 20C, there is a one-to-one correspondence between patent classification codes and evaluation sections, except for the patent classification code "358/906", which corresponds to the two sections development team T5 and development team T6.

First, the patent classification code/evaluation section correspondence table input unit 302 reads out the table shown in FIGS. 20A to 20C, which is stored in the patent classification code/evaluation section correspondence table storage unit 301. Next, the 30 U.S. patent documents shown in FIG. 30 are processed one by one. The text input unit 304 reads the patent document text data case by case from the text storage unit 303, and the patent classification code extraction/counting unit 305 extracts the patent classification codes in the table shown in FIGS. 20A to 20C from the main classes and the secondary classes of patent classification codes associated with the patents of the patent texts, but does not extract the patent classification code from the cited patents. Next, the occurrence count of the extracted patent classification codes is determined by the patent classification code extraction/counting unit 305. The occurrence count of patent classification codes determined with the patent classification code extraction/counting unit 305 is taken as input, and when the occurrence count of patent classification codes in the table shown in FIGS. 20A to 20C is not zero, then the unit 306 for judging the maximum occurrence count of patent classification codes determines the sum of the occurrence counts of patent classification codes corresponding to each evaluation section, and judges the evaluation section for which the sum of the occurrence count is highest. Next, the evaluation section determination unit 307 determines the evaluation section that has been judged by the unit 306 for judging the maximum occurrence count of patent classification codes as the one with the highest sum of the occurrence count to be the most fitting evaluation section. If there is a plurality of highest sums of the occurrence count, then it doesn't matter whether the evaluation section that is found first is selected or whether all evaluation sections having that highest sum of the occurrence count are selected, because in either case an evaluation section can be assigned.

The evaluation section determination result output unit 308 gives out the overall result of the determination by the evaluation section determination unit 307 to the display device 309 and the evaluation section determination result storage unit 310. FIG. 23 shows an example of the output to the display device 309. In FIG. 23, after the program is launched, first the start time is given out, and the file names of the 30 patent specifications and the selected evaluation sections are given out. The content of FIG. 23 is the same as that of FIG. 10, except that there is no "stage 1", "stage 2", and "stage 3" in FIG. 23

First, a result analogous to the overall result for all cases shown in FIG. 11 of the first embodiment is given out to the evaluation section determination result storage unit 310, and then the results for the patent documents that have been temporarily stored are given out. The output to the evaluation section determination result storage unit 310 is formatted in HTML, and in the present embodiment, it is displayed with a browser.

FIG. 24 shows the one case of U.S. Pat. No. 6,044,198 as an example of the individual results. The link buttons at the upper left in FIG. 24 are the same as in the first embodiment, so that their further explanation has been omitted. After the link buttons, a serial number, the patent document file name, the title, the registration date, and the abstract are given out. In the field "occurrence count" of the table in FIG. 24, the occurrence count of all patent classification codes corresponding to the section is displayed. In the field "sum of occurrence count" in the table, the sum of the occurrence counts of the patent classification codes for each section is displayed. The patent classification codes for U.S. Pat. No. 6,044,198 are as follows:

Main class: 386/98

Secondary classes: 386/46, 386/52, 348/705, 358/906

Development team T3 corresponds to 386/98, development team T1 corresponds to 386/46, development team T6 corresponds to 386/52, development team T6 corresponds to 348/705, and development teams T5 and T6 correspond to 358/906. Thus, development team T6, for which the sum of the occurrence counts is largest, is determined as the evaluation section.

With this embodiment (assignment by patent classification code), the evaluation section can be determined in a shorter time than in the first embodiment (assignment by keyword). The time that is needed to process 30 U.S. patent documents was measured for the two cases of choosing and not choosing the option of word analysis in the first embodiment, and the results are shown in FIG. 25. The measurement of the assignment system was performed for three different environments, and in each case, the assignment by patent classification code was more than 100 times faster than the assignment by keyword. FIG. 26 shows the result when FIG. 25 is proportionally extrapolated to 10000 U.S. patents.

There are 82 patent classification code used in the third embodiment for 10 sections, so that each section handles an average of 8.2 patent classification codes. Under the rough assumption that the number of patent classification codes needs to be increased in order to manage more sections, and that the processing time is proportional to the number of patent classification codes, when the number of sections is 20 at an average of 100 patent classification codes per section, then the result is a factor of 2000÷82≈24.3, so that even if the number of keywords is not increased, it can be predicted that the assignment time is shorter, at less than ⅕, than the assignment time with keywords. Thus, if the text evaluation section assignment system of the present invention is applied to patent documents, the patent classification codes corresponding to the evaluation sections are determined from the assignment by keywords, and to assign an extremely large number of patent documents, it is recommended to assign by patent classification code.

Fourth Embodiment

Next, an example of a system for automatically creating a correspondence table of keywords and evaluation sections is explained.

Figure 27:
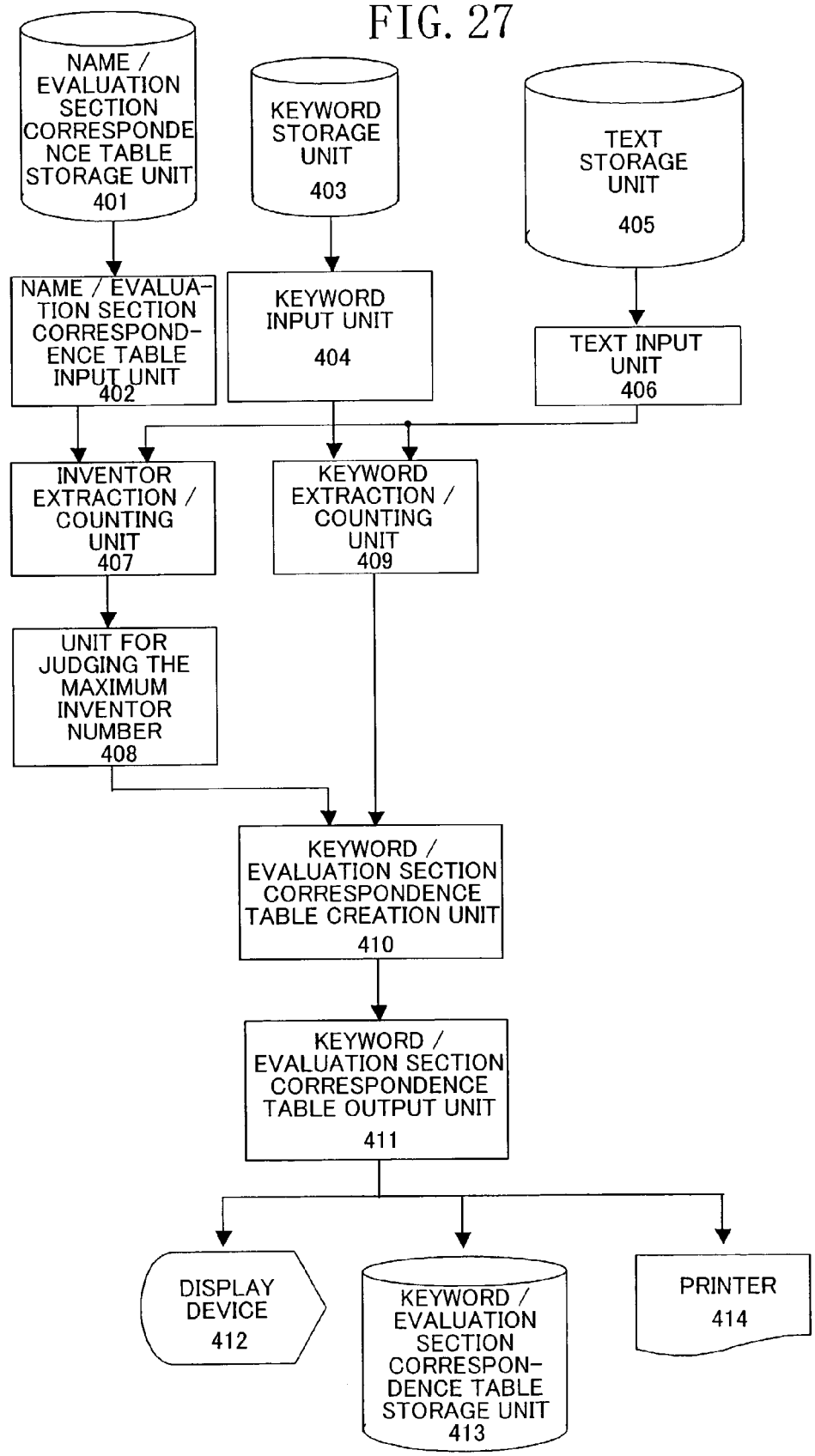
FIG. 27 is a block diagram of the configuration of a keyword/evaluation section correspondence table creation system in accordance with a fourth embodiment of the present invention.

FIG. 27 is a block diagram showing the configuration of the fourth embodiment of the present invention. In FIG. 27, numeral 401 denotes a table storage unit storing a correspondence table of names and evaluation sections, numeral 402 denotes a name/evaluation section correspondence table input unit, numeral 403 denotes a keyword storage unit storing a plurality of keywords, numeral 404 denotes a keyword input unit, numeral 405 denotes a text storage unit storing a plurality of patent documents, numeral 406 denotes a text input unit, numeral 407 denotes an inventor extraction/counting unit for extracting inventors from patent documents and counting the number of inventors listed in the patent document for each evaluation section, numeral 408 denotes a unit for judging the maximum inventor number, numeral 409 denotes a keyword extraction/counting unit for extracting keywords from the patent documents and counting the occurrence count of each keyword, numeral 410 denotes a keyword/evaluation section correspondence table creation unit, numeral 411 denotes a keyword/evaluation section correspondence table output unit, numeral 412 denotes a display device, numeral 413 denotes a keyword/evaluation section correspondence table storage unit, and numeral 414 denotes a printer.

The text data of the 30 U.S. patents shown in FIG. 3 are stored in the text storage unit 405. Furthermore, the correspondence table of names and evaluation sections shown in FIGS. 28A and 28B is stored in the name/evaluation section correspondence table storage unit 401. FIG. 29 shows by reverse indexing of FIGS. 28A and 28B which members are included in the various evaluation sections. It should be noted that in the example of FIG. 28A, FIG. 28B and FIG. 29, the inventors listed in actually existing patent documents are included as imaginary members in order to explain the present invention. The keyword storage unit 403 stores the keywords listed in FIG. 30.

First, the name/evaluation section correspondence table input unit 402 reads out the table shown in FIG. 28A and FIG. 28B, and the keyword input unit 404 reads out the keywords listed in FIG. 30. Next, the 30 U.S. patent documents shown in FIG. 3 are processed one by one. The text input unit 406 reads out the patent document text data case by case, and the inventor extraction/counting unit 407 extracts the names in the table shown in FIGS. 28A and 28B from the area of the patent text that lists the inventors. The inventor number of the extracted inventors is counted for each evaluation section. However, in order to remove like names belonging to another company and not the company in FIG. 1 from the count, the applicant or the assignee may be further extracted from the text data of the patent documents, and the extracted inventors may be compared with the names included in the table shown in FIGS. 28A and 28B, and how many inventors are listed may be counted for each evaluation section after confirming that the applicant or assignee is the legal entity to which the evaluation sections belong (i.e. the company of FIG. 1). The unit 408 for judging the maximum inventor number judges the evaluation section for which the inventor number is maximal. If the inventor number is zero, then "no hit" is judged for the evaluation section. On the other hand, the keyword extraction/counting unit 409 extracts the keywords shown in FIG. 30 from the entire patent texts, and counts the occurrence count of the extracted keywords. The keyword/evaluation section correspondence table creation unit 410 receives for each case the evaluation section from the unit 408 for judging the maximum inventor number, and the keywords and occurrence count form the keyword extraction/counting unit 409, and if for example the evaluation section for the first patent document is "T5," then the keywords extracted from the first patent document are all taken to correspond to "T5."

In this embodiment, the unit 408 for judging the maximum inventor number judges the evaluation section for which the inventor number is largest for each keyword in the 30 patent documents shown in FIG. 3. FIG. 31A and FIG. 31B show the results when the sum of the occurrence count of keywords is determined for each evaluation section in preparation of the establishing of a correspondence between keywords and evaluation sections with the keyword/evaluation section correspondence table creation unit 410. Then, the keyword/evaluation section correspondence table shown in FIGS. 32A and 32B is created by establishing a correspondence between keywords and the evaluation section for which the sum of the occurrence count of keywords is maximal. FIG. 33 shows by reverse indexing of FIGS. 32A and 32B the group of keywords corresponding to the various evaluation sections. Although there are some slight differences to FIG. 7 of the first embodiment, such as that "EDTV" is a keyword for "Y" in FIG. 7 whereas it is a keyword for "T1" in FIG. 33, a similar keyword/evaluation section correspondence table is attained.

With this embodiment, a keyword/evaluation section correspondence table can be created automatically from patents applied for by that section, and even though some manual adjustments may be necessary, the creation time of the keyword/evaluation section correspondence table is shortened considerably. It is clear that a keyword/evaluation section correspondence table also can be created automatically, without relying on the inventor extraction/counting unit 407 and the unit 408 for judging the maximum inventor number, by establishing a correspondence beforehand between evaluation sections and patent documents by using patents that are similar to the patents applied for by the evaluation sections and processing of the keyword extraction/counting unit 409 as in the present embodiment.

Fifth Embodiment

Lastly, an example of a text evaluation section assignment system is explained, which uses both a correspondence table of patent classification codes and evaluation sections and a correspondence table of keywords and evaluation sections.

Figure 34:
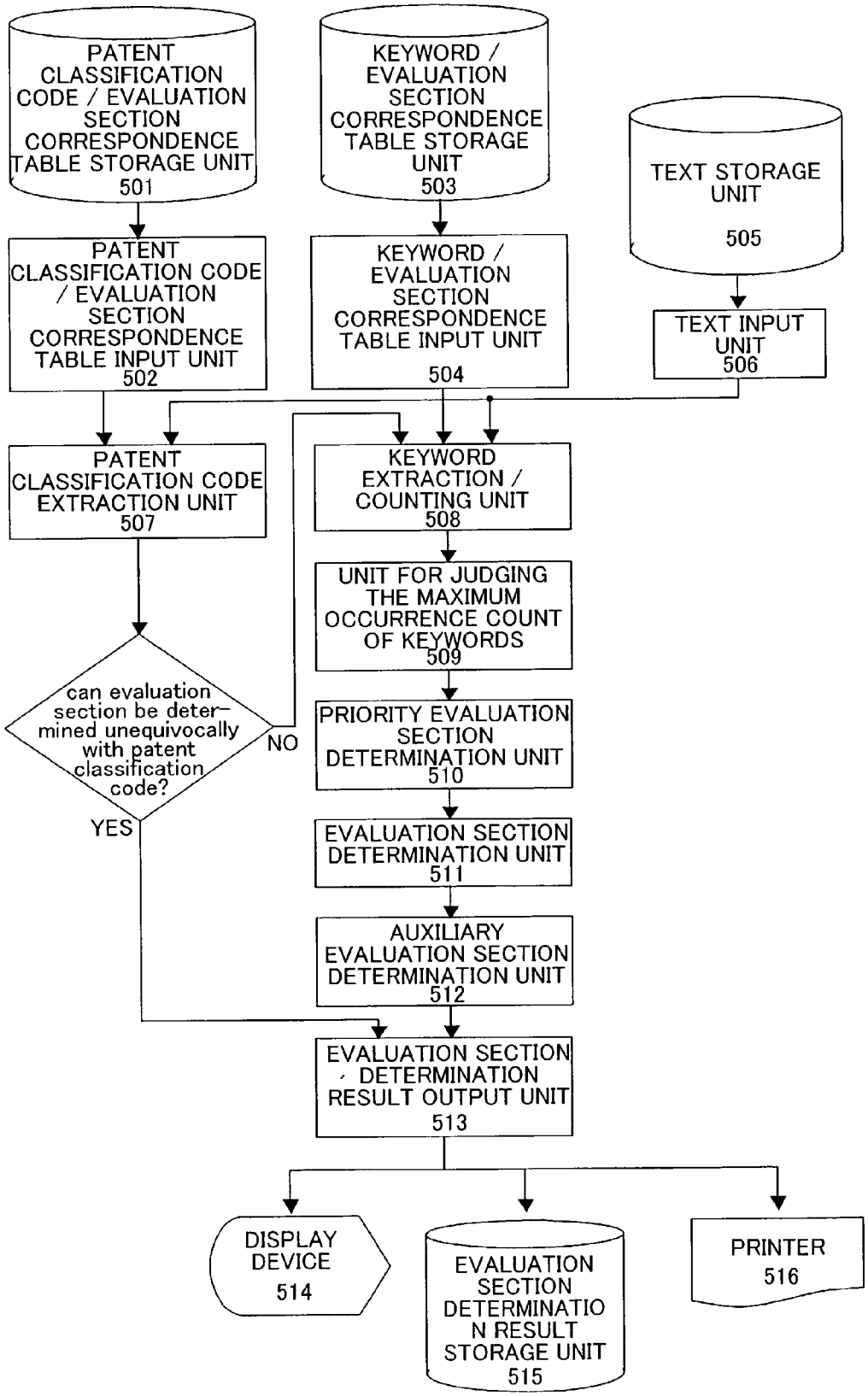
FIG. 34 is a block diagram of the configuration of a text evaluation section assignment system in accordance with a fifth embodiment of the present invention.

FIG. 34 is a block diagram showing the configuration of the fifth embodiment of the present invention. In FIG. 34, numeral 501 denotes a patent classification code/evaluation section correspondence table storage unit storing a correspondence table of patent classification codes and evaluation sections, numeral 502 denotes a patent classification code/evaluation section correspondence table input unit, numeral 503 denotes a keyword/evaluation section correspondence table storage unit for storing a correspondence table of keywords and evaluation sections, numeral 504 denotes a keyword/evaluation section correspondence table input unit, numeral 505 denotes a text storage unit for storing a plurality of patent documents, numeral 506 denotes a text input unit, numeral 507 denotes a patent classification code extraction unit for extracting patent classification codes from the patent documents, numeral 508 denotes a keyword extraction/counting unit for extracting keywords form the patent documents and counting the occurrence count of each keyword, numeral 509 denotes a unit for judging the maximum occurrence count of keywords, numeral 510 denotes a priority evaluation section determination unit, numeral 511 denotes an evaluation section determination unit, numeral 512 denotes an auxiliary evaluation section determination unit, numeral 513 denotes an evaluation section determination result output unit, numeral 514 denotes a display device, numeral 515 denotes an evaluation section determination result storage unit, and numeral 516 denotes a printer.

The text data of the 30 U.S. patents shown in FIG. 3 are stored in the text storage unit 505. Furthermore, the correspondence table of patent classification codes and evaluation sections shown in FIG. 35 is stored in the patent classification code/evaluation section correspondence table storage unit 501. FIG. 36 shows by reverse indexing of FIG. 35 which patent classification codes correspond to the various evaluation sections. Moreover, the keyword/evaluation section correspondence table storage unit 503 stores the regular correspondence table of FIGS. 6A to 6C, the priority correspondence table of FIG. 8 and the auxiliary correspondence table of FIG. 9.

First, the patent classification code/evaluation section correspondence table input unit 502 reads out the table in FIG. 35, and the keyword/evaluation section correspondence table input unit 504 reads out the three keyword/evaluation section correspondence tables shown in FIGS. 6A to 6C, FIG. 8 and FIG. 9. Then, the 30 U.S. patent documents shown in FIG. 3 are processed one by one. The text input unit 506 reads out the text data of the patent documents case by case, and the patent classification code extraction unit 507 extracts the patent classification codes in the table of FIG. 35 from the region in the patent texts that states the U.S. patent classification code of those patents. Here, if the evaluation section can be determined unequivocally with the extracted patent classification code from the patent classification code/evaluation section correspondence table, then the processing from the keyword extraction/counting unit 508 to the auxiliary evaluation section determination unit 512 is omitted. For example, in the example in FIG. 35, the evaluation section "T1" can be determined unequivocally from the patent classification code "375," so that the procedure advances directly to the evaluation section determination result output unit 513. If the evaluation section cannot be determined unequivocally, then the procedure advances to the keyword extraction/counting unit 508. The keyword extraction/counting unit 508 extracts the keywords of the tables in FIGS. 6A to 6C and FIG. 9 from the entire patent texts, and extracts the keywords of the table in FIG. 8 from the abstracts and the claims, and moreover, extracts only for the evaluation sections corresponding to the patent classification codes extracted with the patent classification code extraction unit 507 the keywords corresponding to those evaluation sections. The occurrence count of the extracted keywords is counted. The unit 509 for judging the maximum occurrence count of keywords judges the keywords with the maximum occurrence count for each of the three (priority, regular and auxiliary) correspondence tables. The further processing is the same as that in the first embodiment. However, the evaluation section determination unit 511 determines the evaluation section by looking up the keyword/evaluation section correspondence table corresponding to the evaluation section corresponding to the patent classification code extracted by the patent classification code extraction unit 507, taking at least the keyword having the maximum obtained from the unit 509 for judging the maximum occurrence count of keywords as input.

FIG. 37 shows which the evaluation sections are whose corresponding keywords are used one by one on the patent documents with the keyword extraction/counting unit 508 in this embodiment. In FIG. 37, "1" indicates that the keywords corresponding to this evaluation section are extracted, and "0" indicates that the keywords corresponding to this evaluation section are not extracted. In an environment of a 333 MHz CPU, 384 MB memory and 30 GB hard-disk, the evaluation section assignment execution time when not using the patent classification code/evaluation section correspondence table and extracting all keywords was 27 sec, and the evaluation section assignment execution time when using the patent classification code/evaluation section correspondence table and not extracting the keywords corresponding to the evaluation sections not corresponding to the patent classification codes was 30 sec. This is because the 30 U.S. patents in FIG. 3 are technologically close to one another, and also the evaluation sections in this embodiment deal with similar technologies, so that, as can be seen in FIG. 37, there are not many keywords that are not extracted by the keyword extraction/counting unit 508, and thus if the present invention is applied to an organization in which the technological scope of patents being searched is wide, and in which the evaluation sections deal with a variety of technologies, then it can be predicted that a shortening of the evaluation section assignment execution time can be achieved.

It should be noted that the foregoing embodiments have been explained for U.S. patent documents, but it is self-evident that the present invention can be applied to all kinds of texts, or to patent documents that are not from the U.S., and that the patent classification code can be the international patent classification code or the national patent classification codes of any country.

If for example scientific publications are used for the creation of the keyword/evaluation section correspondence tables, then it is also possible to provide, instead of the inventor extraction/counting unit 407 in FIG. 27, an author extraction/counting unit that extracts authors from scientific publications, compares the authors with the names included in a name/evaluation section correspondence table, and counts how many authors there are per evaluation section.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A text classification system, comprising:
   a table storage means for storing a priority correspondence table, a regular correspondence table and an auxiliary correspondence table, each indicating a correspondence between keywords and categories;
   a table input means for inputting the correspondence tables from the table storage means;
   a text storage means for storing a plurality of texts;
   a text input means for inputting a text from the text storage means;
   a keyword extraction/counting means for extracting keywords included in the correspondence tables from the text obtained from the text input means and counting how many of those keywords are included; and
   a category determination means that,
      when there is a keyword included in the priority correspondence table whose occurrence count is not zero, determines at least a category corresponding to the keyword with the maximum occurrence count as an assignment category;
      when the occurrence count of all keywords included in the priority correspondence table is zero and when there is a keyword included in the regular correspondence table whose occurrence count is not zero, determines at least the category corresponding to the keyword with the maximum occurrence count as the assignment category;
      when the occurrence count of all keywords included in the priority correspondence table and the regular correspondence table is zero and when there is a keyword included in the auxiliary correspondence table whose occurrence count is not zero, determines at least the category corresponding to the keyword with the maximum occurrence count as the assignment category.

2. The text classification system according to claim 1, wherein the texts are divided into a plurality of regions, the keyword extraction/counting means references only a specific region in the texts for keywords included the priority correspondence table, and references the entire texts for keywords included in the regular correspondence table and the auxiliary correspondence table.

3. The text classification system according to claim 1, wherein the category determination means, after determining sums of the occurrence counts of keywords corresponding to each category, judges a maximum of the sums of the occurrence count, and determines at least the category for which the maximum sum of the occurrence counts is given as the assignment category.

4. The text classification system according to claim 1, wherein weightings for each keyword are additionally stored in the priority correspondence table, the regular correspondence table and the auxiliary correspondence table;
   wherein the keyword extraction/counting means takes the values obtained by multiplying the count value of each keyword with its weighting as the occurrence count of those keywords.

5. A text assignment system for assigning text to an evaluation section, comprising:
   a table storage means for storing a correspondence table of keywords and evaluation sections;
   a table input means for inputting the correspondence table of keywords and evaluation sections from the table storage means;
   a text storage means for storing a plurality of texts;
   a text input means for inputting a text from the text storage means;
   a keyword extraction/counting means for extracting keywords included in the correspondence table from the text obtained from the text input means and counting how many of those keywords are included;
   a maximum judgment means for judging a maximum of the occurrence counts of the keywords counted by the keyword extraction/counting means; and
   an evaluation section determination means for determining an evaluation section by looking up the correspondence table taking at least the keyword having the maximum obtained by the maximum judgment means as input, wherein the table storage means further stores a priority correspondence table of keywords and evaluation sections, the keyword extraction/counting means extracts the keywords included in the priority correspondence table and counts how many of those keywords are included, the maximum judgment means judges the maximum of the occurrence counts of the keywords included in the priority correspondence table counted by the keyword extraction/counting means, and the text evaluation section assignment system further comprises a priority evaluation section determination means that, when the occurrence count of keywords included in the priority correspondence table is not zero, determines an evaluation section by looking up the priority correspondence table taking at least the keyword having the maximum occurrence count of the keywords included in the priority correspondence table as input, in priority to the evaluation section determination means.

6. A text assignment system for assigning text to an evaluation section, comprising:

a table storage means for storing a correspondence table of keywords and evaluation sections;

a table input means for inputting the correspondence table of keywords and evaluation sections from the table storage means;

a text storage means for storing a plurality of texts;

a text input means for inputting a text from the text storage means;

a keyword extraction/counting means for extracting keywords included in the correspondence table from the text obtained from the text input means and counting how many of those keywords are included;

a maximum judgment means for judging a maximum of the occurrence counts of the keywords counted by the keyword extraction/counting means; and an evaluation section determination means for determining an evaluation section by looking up the correspondence table taking at least the keyword having the maximum obtained by the maximum judgment means as input, wherein the table storage means further stores an auxiliary correspondence table of keywords and evaluation sections, the keyword extraction/counting means extracts the keywords included in the auxiliary correspondence table and counts how many of those keywords are included, the maximum judgment means judges the maximum of the occurrence counts of the keywords included in the auxiliary correspondence table counted by the keyword extraction/counting means, and the text evaluation system further comprises an auxiliary evaluation section determination means that, when no evaluation section has been determined by the evaluation section determination means, determines the evaluation section by looking up the auxiliary correspondence table taking at least the keyword having the maximum occurrence count of the keywords included in the auxiliary correspondence table as input.

7. A patent classification code/evaluation section correspondence table creation system, comprising:

a table storage means for storing a correspondence table of keywords and evaluation sections;

a table input means for inputting the correspondence table of keywords and evaluation sections from the table storage means;

a text storage means for storing a plurality of patent documents;

a text input means for inputting a patent document from the text storage means;

a keyword extraction/counting means for extracting keywords included in the correspondence table from the patent document obtained from the text input means and counting how many of those keywords are included;

a maximum judgment means for judging a maximum of the occurrence counts of the keywords counted by the keyword extraction/counting means;

an evaluation section determination means for determining an evaluation section by looking up the correspondence table taking at least the keyword having the maximum obtained by the maximum judgment means as input;

a patent classification code extraction means for extracting patent classification codes stated in the patent document obtained from the text input means; and a table creation means for creating a correspondence table of patent classification codes and evaluation sections, based on the evaluation sections obtained from the evaluation section determination means and the patent classification codes obtained from the patent classification code extraction means, wherein the table storage means further stores a priority correspondence table of keywords and evaluation sections, the keyword extraction/counting means extracts the keywords included in the priority correspondence table and counts how many of those keywords are included, the maximum judgment means judges the maximum of the occurrence counts of the keywords included in the priority correspondence table counted by the keyword extraction/counting means, and the patent classification code/evaluation section correspondence table creation system further comprises a priority evaluation section determination means that, when the occurrence count of keywords included in the priority correspondence table is not zero, determines an evaluation section by looking up the priority correspondence table taking at least the keyword having the maximum occurrence count of the keywords included in the priority correspondence table as input, in priority to the evaluation section determination means.

8. The patent classification code/evaluation section correspondence table creation system according to claim 7, wherein the keyword extraction/counting means references only the abstract and the claims in the patent documents for keywords included the priority correspondence table.

9. A patent classification code/evaluation section correspondence table creation system, comprising:

a table storage means for storing a correspondence table of keywords and evaluation sections;

a table input means for inputting the correspondence table of keywords and evaluation sections from the table storage means;

a text storage means for storing a plurality of patent documents;

a text input means for inputting a patent document from the text storage means;

a keyword extraction/counting means for extracting keywords included in the correspondence table from the patent document obtained from the text input means and counting how many of those keywords are included;

a maximum judgment means for judging a maximum of the occurrence counts of the keywords counted by the keyword extraction/counting means;

an evaluation section determination means for determining an evaluation section by looking up the correspondence table taking at least the keyword having the maximum obtained by the maximum judgment means as input;

a patent classification code extraction means for extracting patent classification codes stated in the patent document obtained from the text input means; and a table creation means for creating a correspondence table of patent classification codes and evaluation sections, based on the evaluation sections obtained from the evaluation section determination means and the patent classification codes obtained from the patent classification code extraction means, wherein the table storage means further stores an auxiliary correspondence table of keywords and evaluation sections, the keyword extraction/counting means extracts the keywords included in the auxiliary correspondence table and counts how many of those keywords are included, the maximum judgment means judges the maximum of the occurrence counts of the keywords included in the auxiliary correspondence table counted by the keyword extraction/counting means, and the patent classification code/evaluation section correspondence table creation system further comprises an auxiliary evaluation section determination means that, when no evaluation section has been determined by the evaluation section determination means, determines the evaluation section by looking up the auxiliary correspondence table taking at least the keyword having the maximum occurrence count of the keywords included in the auxiliary correspondence table as input.

10. A patent document assignment system for assigning text to an evaluation section, comprising:

a patent classification code/evaluation section correspondence table storage means for storing a correspondence table of patent classification codes and evaluation sections;

a patent classification code/evaluation section correspondence table input means for inputting the correspondence table of patent classification codes and evaluation sections from the patent classification code/evaluation section correspondence table storage means;

a keyword/evaluation section correspondence table storage means for storing a correspondence table of keywords and evaluation sections;

a keyword/evaluation section correspondence table input means for inputting the correspondence table of keywords and evaluation sections from the keyword/evaluation section correspondence table storage means;

a text storage means for storing a plurality of patent documents;

a text input means for inputting a patent document from the text storage means;

a patent classification code extraction means for extracting patent classification codes included in the patent classification code/evaluation section correspondence table from the patent document obtained from the text input means;

a keyword extraction/counting means which, when extracting the keywords included in the keyword/evaluation section correspondence table from the patent document obtained from the text input means, extracts only keywords corresponding to evaluation sections corresponding to the patent classification codes extracted by the patent classification code extraction means, and counts how many of those keywords are included;

a maximum judgment means for judging a maximum of the occurrence counts of the keywords counted by the keyword extraction/counting means; and an evaluation section determination means for determining an evaluation section by looking up the keyword/evaluation section correspondence table corresponding to the evaluation section corresponding to the patent classification codes extracted by the patent classification code extraction means, taking at least the keyword having the maximum obtained by the maximum judgment means as input, wherein the keyword/evaluation correspondence table storage means further stores a priority correspondence table of keywords and evaluation sections, the keyword extraction/counting means extracts the keywords included in the priority correspondence table and counts how many of those keywords are included, the maximum judgment means judges the maximum of the occurrence counts of the keywords included in the priority correspondence table counted by the keyword extraction/counting means, and the patent document evaluation section assignment system further comprises a priority evaluation section determination means that, when the occurrence count of keywords included in the priority correspondence table is not zero, determines an evaluation section by looking up the priority correspondence table taking at least the keyword having the maximum occurrence count of the keywords included in the priority correspondence table as input, in priority to the evaluation section determination means.

11. The patent document assignment system according to claim 10, wherein the texts are divided into a plurality of regions, the keyword extraction/counting means references only a specific region in the patent documents for keywords included the priority correspondence table.

12. A patent document assignment system for assigning text to an evaluation section, comprising:

a patent classification code/evaluation section correspondence table storage means for storing a correspondence table of patent classification codes and evaluation sections;

a patent classification code/evaluation section correspondence table input means for inputting the correspondence table of patent classification codes and evaluation sections from the patent classification code/evaluation section correspondence table storage means;

a keyword/evaluation section correspondence table storage means for storing a correspondence table of keywords and evaluation sections;

a keyword/evaluation section correspondence table input means for inputting the correspondence table of keywords and evaluation sections from the keyword/evaluation section correspondence table storage means;

a text storage means for storing a plurality of patent documents;

a text input means for inputting a patent document from the text storage means;

a patent classification code extraction means for extracting patent classification codes included in the patent classification code/evaluation section correspondence table from the patent document obtained from the text input means;

a keyword extraction/counting means which, when extracting the keywords included in the keyword/evaluation section correspondence table from the patent document obtained from the text input means, extracts only keywords corresponding to evaluation sections corresponding to the patent classification codes extracted by the patent classification code extraction means, and counts how many of those keywords are included;

a maximum judgment means for judging a maximum of the occurrence counts of the keywords counted by the keyword extraction/counting means; and an evaluation section determination means for determining an evaluation section by looking up the keyword/evaluation section correspondence table corresponding to the evaluation section corresponding to the patent classification codes extracted by the patent classification code extraction means, taking at least the keyword having the maximum obtained by the maximum judgment means as input, wherein the keyword/evaluation section correspondence table storage means further stores an auxiliary correspondence table of keywords and evaluation sections, the keyword extraction/counting means extracts the keywords included in the auxiliary correspondence table and counts how many of those keywords are included, the maximum judgment means judges the maximum of the occurrence counts of the keywords included in the auxiliary correspondence table counted by the keyword extraction/counting means, and the patent document evaluation section assignment system further comprises an auxiliary evaluation section determination means that, when no evaluation section has been determined by the evaluation section determination means, determines the evaluation section by looking up the auxiliary correspondence table taking at least the keyword having the maximum occurrence count of the keywords included in the auxiliary correspondence table as input.

* * * * *